United States Patent
Zorgui et al.

(10) Patent No.: US 12,256,285 B2
(45) Date of Patent: Mar. 18, 2025

(54) POSITIONING WITH A SIMPLE REPEATER

(71) Applicant: QUALCOMM Incorporated, San Diego, CA (US)

(72) Inventors: Marwen Zorgui, San Diego, CA (US); Srinivas Yerramalli, Hyderabad (IN); Mohammad Tarek Fahim, Tucson, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 17/373,108

(22) Filed: Jul. 12, 2021

(65) Prior Publication Data

US 2023/0008390 A1   Jan. 12, 2023

(51) Int. Cl.
*H04W 4/23* (2018.01)
*G01S 5/02* (2010.01)
(Continued)

(52) U.S. Cl.
CPC .......... *H04W 4/023* (2013.01); *G01S 5/0205* (2013.01); *G01S 11/04* (2013.01); *G01S 11/06* (2013.01);
(Continued)

(58) Field of Classification Search
CPC . H04W 24/10; H04W 56/001; H04W 84/047; H04W 16/26; H04W 52/245;
(Continued)

(56) References Cited

U.S. PATENT DOCUMENTS 9,645,604 B1 * 5/2017 Nebesnyi ................. G06F 1/12
10,438,430 B2 * 10/2019 Hayashi .................. E05B 81/78
(Continued)

OTHER PUBLICATIONS

3GPP TR 25.956: "3rd Generation Partnership Project, Technical Specification Group Radio Access Network, Universal Terrestrial Radio Access (UTRA) Repeater Planning Guidelines and System Analysis (Release 16)", 3GPP Standard, Technical Report, 3GPP, Mobile Competence Centre, 650, Route Des Lucioles, F-06921 Sophia-Antipolis Cedex, France, vol. RAN WG4, No. V16.0.0 (Jun. 2020), Jul. 16, 2020, pp. 1-59, XP051925252, paragraph [04.6].
(Continued)

*Primary Examiner* — Joseph Arevalo
(74) *Attorney, Agent, or Firm* — Thien T. Nguyen

(57) ABSTRACT

This disclosure provides systems, methods, and devices for wireless communication that support enhanced positioning operations using a repeater. In a first aspect, a method of wireless communication includes receiving, by the UE, an instruction from a base station (BS) to perform a first signal measurement at a first time and a second signal measurement at a second time; determining, by the UE and based on the instruction, a first signal characteristic of a first signal during the first time corresponding to a time when a first repeater is repeating the first signal from a base station; determining, by the UE and based on the instruction, a second signal characteristic of a second signal during the second time corresponding to a time when the first repeater is not repeating the second signal; and a location of the UE is determined based on the first signal characteristic and the second signal characteristic.

30 Claims, 16 Drawing Sheets

(51) Int. Cl.
  *G01S 11/04*  (2006.01)
  *G01S 11/06*  (2006.01)
  *H04W 4/02*  (2018.01)
  *H04W 24/10*  (2009.01)
  *H04W 56/00*  (2009.01)
  *H04W 64/00*  (2009.01)

(52) U.S. Cl.
  CPC ....... *H04W 24/10* (2013.01); *H04W 56/0055* (2013.01); *H04W 64/003* (2013.01)

(58) Field of Classification Search
  CPC ............. H04W 52/46; H04W 72/0473; H04W 74/004; H04W 74/008; H04W 74/0833; H04W 4/023; H04W 48/12; H04W 52/42; H04W 52/52; H04W 56/0055; H04W 64/00; H04W 64/003; H04W 72/23; H04W 48/16; H04W 52/0206; H04W 52/0225; H04W 52/262; H04W 52/367; H04W 72/0446; H04W 72/0453; H04W 72/1273
  USPC .... 455/456, 456.3, 9, 509, 7, 420, 410, 520, 455/422.1, 424, 11.1, 41.3
  See application file for complete search history.

(56) References Cited

U.S. PATENT DOCUMENTS

| | | | | |
|---|---|---|---|---|
| 2010/0015915 | A1* | 1/2010 | Nawata | H04W 88/04 455/7 |
| 2016/0128105 | A1* | 5/2016 | Dunsbergen | H04W 4/80 370/329 |
| 2017/0079024 | A1* | 3/2017 | Gerszberg | H04W 72/541 |
| 2017/0245311 | A1* | 8/2017 | Murray | H04W 12/033 |
| 2018/0159231 | A1* | 6/2018 | Barnickel | H01Q 13/06 |
| 2018/0332541 | A1* | 11/2018 | Liu | H04W 52/10 |
| 2020/0344813 | A1* | 10/2020 | Li | H04W 74/0833 |
| 2020/0403689 | A1* | 12/2020 | Rofougaran | H04W 52/245 |
| 2021/0027608 | A1* | 1/2021 | Shakedd | G08B 21/24 |
| 2021/0144735 | A1 | 5/2021 | Manolakos et al. | |
| 2021/0203541 | A1* | 7/2021 | Horiuchi | H04W 28/0273 |

OTHER PUBLICATIONS

3GPP TR 43.030: "3rd Generation Partnership Project, Technical Specification Group GSM/EDGE Radio Access Network, Radio Network Planning Aspects (Release 11)", 3GPP Standard, 43030-B00, 3rd Generation Partnership Project (3GPP), Mobile Competence Centre, 650, Route Des Lucioles, F-06921 Sophia-Antipolis Cedex, France, V11.0.0 (Sep. 2012), Sep. 18, 2012, pp. 1-42, XP050906387, paragraph [D.12].

3GPP TS 25.305: "3rd Generation Partnership Project, Technical Specification Group Radio Access Network, Stage 2 Functional Specification of User Equipment (UE) Positioning in UTRAN (Release 16)", 3GPP Standard, Technical Specification, 3GPP, Mobile Competence Centre, 650, Route Des Lucioles, F-06921 Sophia-Antipolis Cedex, France, vol. RAN WG6, No. V16.0.0, Jul. 18, 2020, pp. 1-95, XP051925523, paragraph [0007] - [0011].

International Search Report and Written Opinion—PCT/US2022/072692—ISA/EPO—Sep. 15, 2022.

* cited by examiner

POSITIONING WITH A SIMPLE REPEATER

TECHNICAL FIELD

Aspects of the disclosure relate generally to wireless communications.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs or enhanced node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

The wireless communication network may be used to assist in positioning operations for identifying a location of components. Users may use GPS systems, handheld devices, and other routing systems to navigate from one point to another (sometimes through several intermediate points). The routing systems can receive a set of signals (e.g., navigation signals from satellites in the case of satellite-based positioning systems, radio signals from access points in the case of positioning systems based on wireless technology, etc.) for navigation purposes. The routing systems can analyze the received signals and determine timing information associated with the received signals to determine the user's position using various techniques based on time of arrival, time difference of arrival, trilateration, triangulation, etc.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure provides systems, apparatus, methods, and computer-readable media that support positioning operations for determining a location of a device, referred to as a user equipment (UE), on a wireless communication network, such as a 5G NR wireless communications network. A positioning operation for a UE may include determining a location of the UE based on multiple signal measurements from signals transmitted from multiple sources at various locations. For example, a repeater in a cell of the wireless communication network may receive and retransmit an original signal from a base station as a repeated signal from the location of the repeater. The repeater may improve reception at an edge of a cell to which the UE is connected and/or improve reception in regions of a cell that are shadowed by obstructions, such as tall structures or hills. The UE may receive the same signal from the base station and the repeater such that the UE appears to be receiving the same signal from multiple locations (e.g., from the base station location and from the repeater location). Although the repeater is provided for improving signal level and data rates within the cell of the wireless communication network, a measurement of the original signal from the base station may still provide a signal characteristic that is useful for determining UE location despite that original signal not providing a high data rate or reliable communications channel for the UE. Further, the combination of measurements of the repeated signal from the repeater location and the original signal from the base station may be used to improve positioning operations to determine the location of the UE. The base station may coordinate the turning on and turning off of the repeater along with the signal measurements by the UE to determine signal characteristics of signals received from the different locations of the base station and the repeater. The base station and/or the UE may use the determined signal characteristics to determine the UE location. In further embodiments, the UE location may be determined by other servers or devices coupled to the wireless communication network and the location conveyed through the base station to the UE. For example, in UE-assisted mode, a location server (e.g., Location Management Function LMF) determines the location of the UE based on signal measurements reported by the UE to the base station and relayed to the location server. In this context, the base station does not determine the location of the UE but still provide the determination of the location to the UE.

Particular implementations of the subject matter described in this disclosure may be implemented to realize one or more of the following potential advantages or benefits. In some aspects, the present disclosure provides techniques for the use of a repeater to extend the signal from the base station and improve data rates for connected UEs while also improving location determination in positioning operations. The use of repeaters allows improved wireless communication without increasing deployment and operating costs by building additional base stations and thus may be beneficial in a wireless communication network. However, because the UE may not know that a received signal is repeated from rather than generated by the source of the received transmission, positioning operations for the UE may lead to incorrect location determinations. Providing instructions to the UE to perform signal measurements for a positioning operation at specific times during which the repeater is on or off may result in measurements that assist with the location determination. Further, the precision of the UE location may be improved by using two or more signal measurements, in which one of the signal measurements is on a signal transmitted from a base station and one of the signal measurements is on a signal transmitted from a repeater on behalf of the base station. Two signal measurements from two or more geographically diverse signal source locations (e.g., the base station and a repeater) can improve triangulation and/or trilateration of the UE location. Example applications for improved positioning include better routing based on availability and reliability of positioning techniques according to embodiments described herein.

In one aspect of the disclosure, a method of wireless communication includes receiving, by the UE, an instruction from a base station (BS) to perform a first signal measurement at a first time and a second signal measurement at a second time. The method further includes determining, by the UE and based on the instruction, a first signal characteristic of a first signal during the first time corresponding to a time when a first repeater is repeating the first signal from a base station; determining, by the UE and based on the instruction, a second signal characteristic of a second signal during the second time corresponding to a time when the first repeater is not repeating the second signal; and/or obtaining a location of the UE, wherein the location of the UE is determined based on the first signal characteristic and the second signal characteristic.

In an additional aspect of the disclosure, an apparatus configured for wireless communication is disclosed. The apparatus includes at least one processor, and a memory coupled to the at least one processor. The at least one processor is configured to receive, by the UE, an instruction to perform a first signal measurement at a first time and a second signal measurement at a second time. The at least one processor is further configured to determine, by the UE and based on the instruction, a first signal characteristic of a first signal during the first time corresponding to a time when a first repeater is repeating the first signal from a base station; determine, by the UE and based on the instruction, a second signal characteristic of a second signal during the second time corresponding to a time when the first repeater is not repeating the second signal; and/or obtain a location of the UE based on the first signal characteristic and the second signal characteristic.

In an additional aspect of the disclosure, an apparatus configured for wireless communication is disclosed. The apparatus includes means for receiving an instruction from a base station (BS) to perform a first signal measurement at a first time and a second signal measurement at a second time. The apparatus further includes means for determining, by the UE and based on the instruction, a first signal characteristic of a first signal during the first time corresponding to a time when a first repeater is repeating the first signal from a base station; means for determining, by the UE and based on the instruction, a second signal characteristic of a second signal during the second time corresponding to a time when the first repeater is not repeating the second signal; and/or means for obtaining a location of the UE, wherein the location of the UE is determined based on the first signal characteristic and the second signal characteristic.

In an additional aspect of the disclosure, a non-transitory computer-readable medium stores instructions that, when executed by a processor, cause the processor to perform operations including receiving, by the UE, an instruction from a base station (BS) to perform a first signal measurement at a first time and a second signal measurement at a second time. The operations further include determining, by the UE and based on the instruction, a first signal characteristic of a first signal during the first time corresponding to a time when a first repeater is repeating the first signal from a base station; determining, by the UE and based on the instruction, a second signal characteristic of a second signal during the second time corresponding to a time when the first repeater is not repeating the second signal; and/or obtaining a location of the UE, wherein the location of the UE is determined based on the first signal characteristic and the second signal characteristic.

In an additional aspect of the disclosure, a method of wireless communication includes transmitting, by the base station, an instruction for a user equipment (UE) to perform a first signal measurement at a first time and a second signal measurement at a second time. The method further includes transmitting, by the base station, an instruction for a first repeater to repeat a first signal corresponding to the first signal measurement during the first time and to not repeat a second signal corresponding to the second signal measurement during the second time; transmitting, by the base station, the first signal during the first time and the second signal during the second time; receiving a first signal characteristic corresponding to the first signal measurement and a second signal characteristic corresponding to the second signal measurement and/or obtaining the location of the UE, wherein the location of the UE is based on the first signal characteristic and the second signal characteristic.

In an additional aspect of the disclosure, an apparatus configured for wireless communication is disclosed. The apparatus includes at least one transceiver, at least one processor coupled to the at least one transceiver, and a memory coupled to the at least one processor. The at least one processor is configured to transmit, by the base station, an instruction for a user equipment (UE) to perform a first signal measurement at a first time and a second signal measurement at a second time. The at least one processor is further configured to transmit, by the base station, an instruction for a first repeater to repeat a first signal corresponding to the first signal measurement during the first time and to not repeat a second signal corresponding to the second signal measurement during the second time; transmit, by the base station, the first signal during the first time and the second signal during the second time; receive, by the BS, a first signal characteristic corresponding to the first signal measurement and a second signal characteristic corresponding to the second signal measurement; and/or obtain the location of the UE, wherein the location of the UE is based on the first signal characteristic and the second signal characteristic.

In an additional aspect of the disclosure, an apparatus configured for wireless communication is disclosed. The apparatus includes means for transmitting, by the base station, an instruction for a user equipment (UE) to perform a first signal measurement at a first time and a second signal measurement at a second time. The apparatus further includes means for transmitting, by the base station, an instruction for a first repeater to repeat a first signal corresponding to the first signal measurement during the first time and to not repeat a second signal corresponding to the second signal measurement during the second time; means for transmitting, by the base station, the first signal during the first time and the second signal during the second time; means for receiving a first signal characteristic corresponding to the first signal measurement and a second signal characteristic corresponding to the second signal measurement; and/or means for obtaining the location of the UE, wherein the location of the UE is based on the first signal characteristic and the second signal characteristic.

In an additional aspect of the disclosure, a non-transitory computer-readable medium stores instructions that, when executed by a processor, cause the processor to perform operations including transmitting, by the base station, an instruction for a user equipment (UE) to perform a first signal measurement at a first time and a second signal measurement at a second time. The operations further include transmitting, by the base station, an instruction for a first repeater to repeat a first signal corresponding to the first signal measurement during the first time and to not repeat a second signal corresponding to the second signal measurement during the second time; transmitting, by the base station, the first signal during the first time and the second signal during the second time; receiving a first signal characteristic corresponding to the first signal measurement and a second signal characteristic corresponding to the second signal measurement; and/or obtaining the location of the UE, wherein the location of the UE is based on the first signal characteristic and the second signal characteristic.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
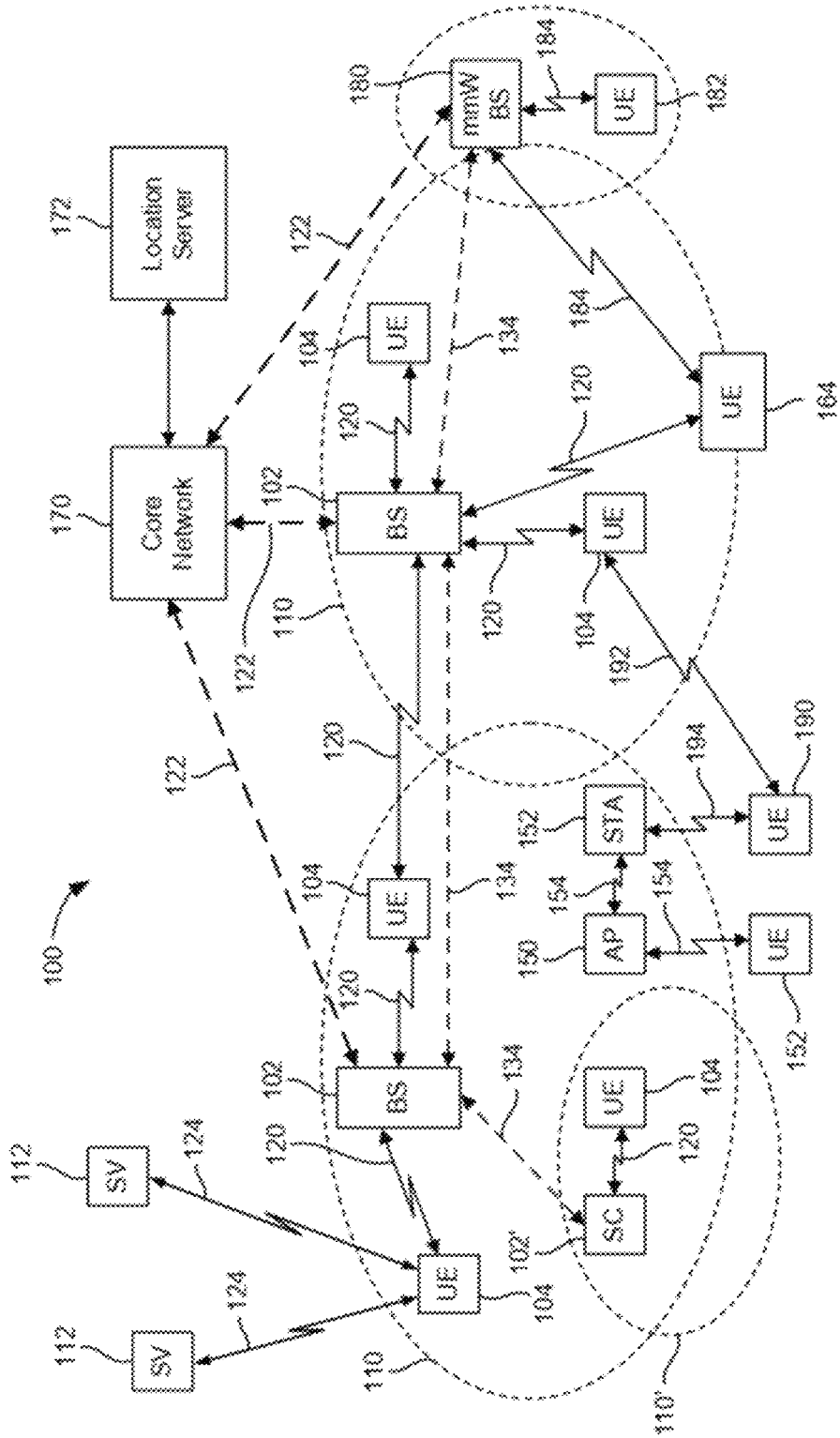
FIG. 1 illustrates an example wireless communications system, according to aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support positioning operations for determining a location of a device, referred to as a user equipment (UE), on a wireless communication network, such as a 5G NR wireless communications network. A positioning operation for a UE may include determining a location of the UE based on multiple signal measurements from signals transmitted from multiple locations. For example, a repeater in a cell of the wireless communication network may receive and retransmit an original signal from a base station as a repeated signal from the location of the repeater. The repeater may improve reception at an edge of a cell to which the UE is connected and/or improve reception in regions of a cell that are shadowed by obstructions, such as tall structures or hills. The UE may receive the same signal from the base station and the repeater such that the UE appears to be receiving the same signal from multiple locations (e.g., from the base station location and from the repeater location). Although the repeater is provided for improving signal level and data rates within the cell of the wireless communication network, a measurement of the original signal from the base station may still provide a signal characteristic that is useful for determining UE location despite that original signal not providing a high data rate or reliable communications channel for the UE. Further, the combination of measurements of the repeated signal from the repeater location and the original signal from the base station may be used to improve positioning operations to determine the location or the UE. The base station may coordinate the turning on and turning off of the repeater along with the signal measurements by the UE to determine signal characteristics of signals received from the different locations of the base station and the repeater. The base station and/or the UE may use the determined signal characteristics to determine the UE location.

Particular implementations of the subject matter described in this disclosure may be implemented to realize one or more of the following potential advantages or benefits. In some aspects, the present disclosure provides techniques for the use of a repeater to extend the signal from the base station and improve data rates for connected UEs while also improving location determination in positioning operations. The use of repeaters allows improved wireless communication without increasing deployment and operating costs by building additional base stations and thus may be beneficial in a wireless communication network. However, because the UE may not know that a received signal is repeated from rather than generated by the source of the received transmission, positioning operations for the UE may lead to incorrect location determinations. Providing instructions to the UE to perform signal measurements for a positioning operation at specific times during which the repeater is on or off may result in measurements that assist with the location determination. Further, the precision of the UE location may be improved by using two or more signal measurements, in which one of the signal measurements is on a signal transmitted from a base station and one of the signal measurements is on a signal transmitted from a repeater on behalf of the base station. Two signal measurements from two geographically diverse signal source locations (e.g., the base station and a repeater) can improve triangulation of the UE location.

The UE, BS, and repeater may be components in a wireless communications network. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example, an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
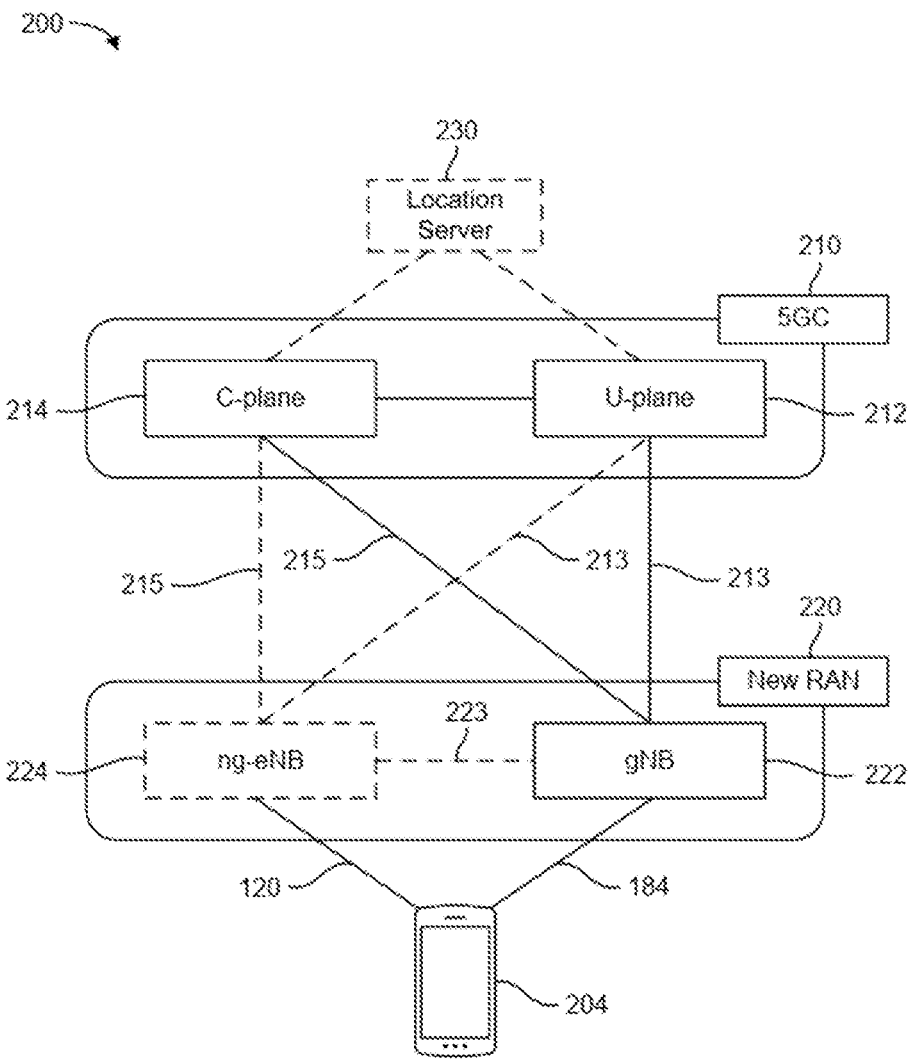
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
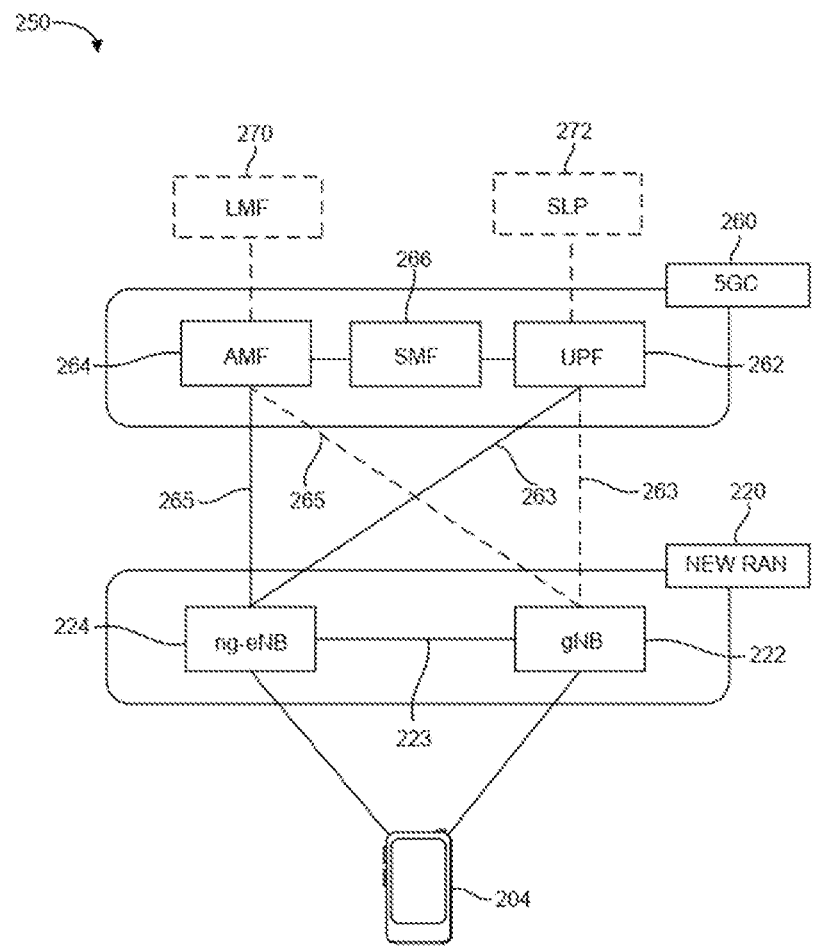

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
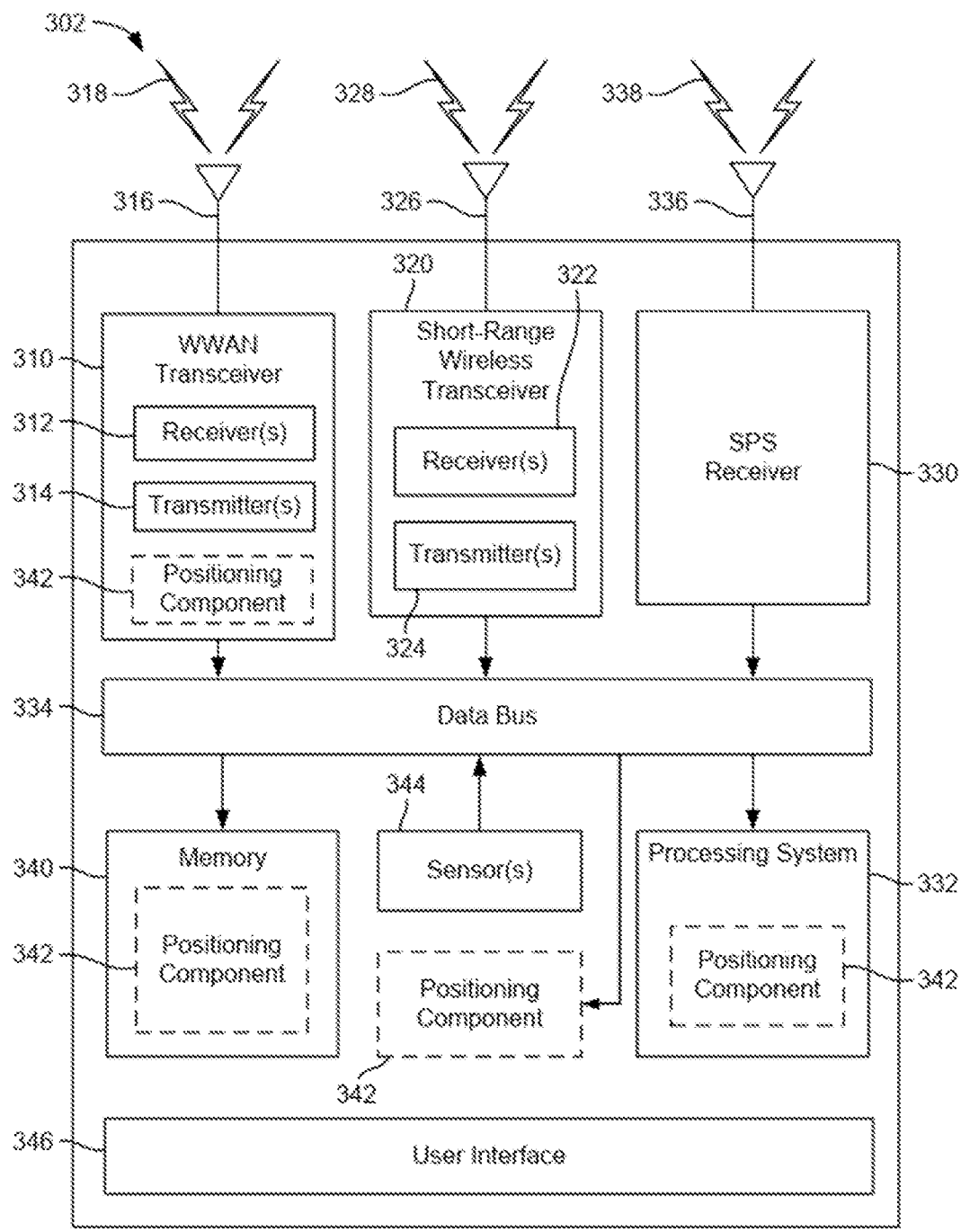
FIGS. 3A to 3C are simplified block diagrams of several sample aspects of components that may be employed in a user equipment (UE), a base station, and a network entity, respectively, and configured to support communications as taught herein.
Figure 3B:
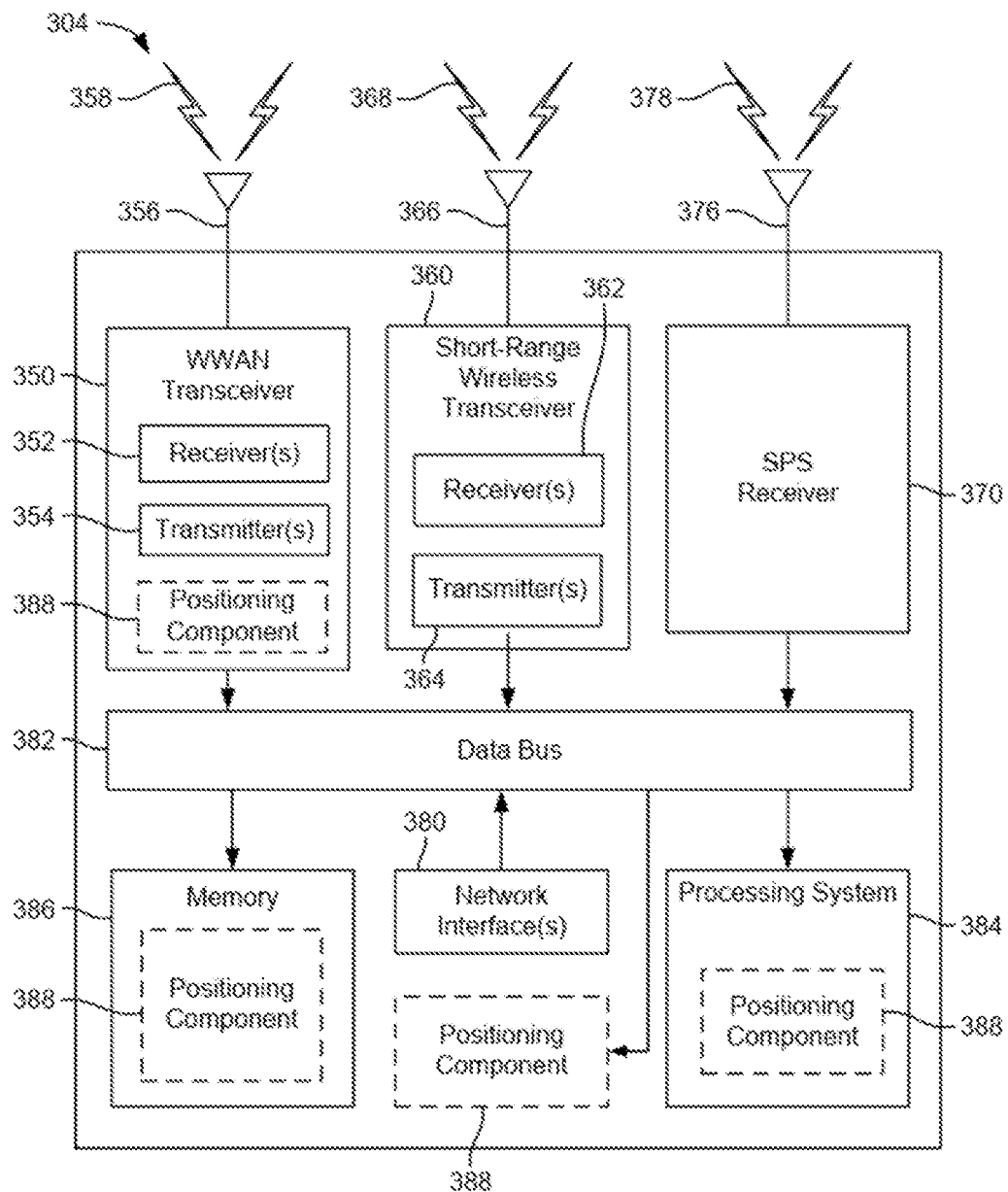
Figure 3C:
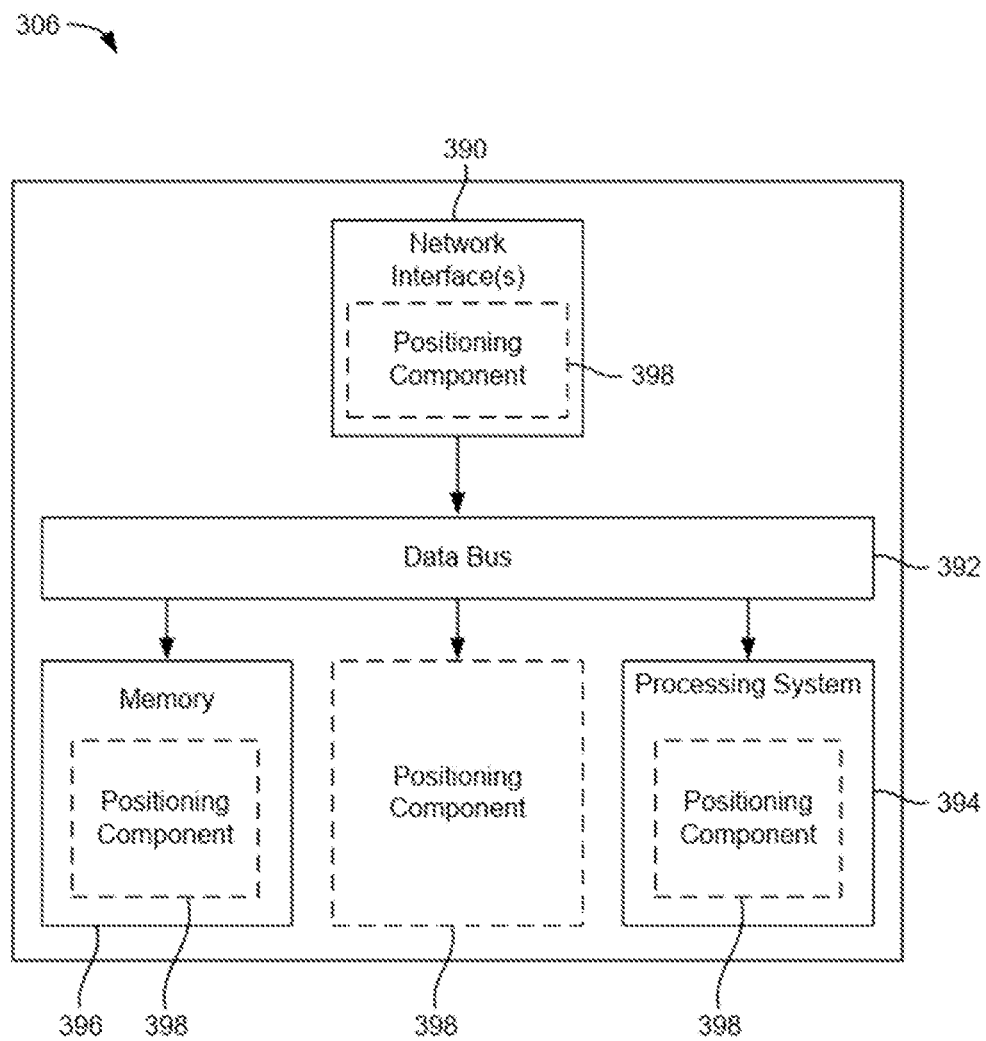

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be wireless local area network (WLAN) transceivers, Bluetooth® transceivers, Zigbee® and/or Z-Wave® transceivers, near-field communication (NFC) transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the positioning components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be determined (e.g., using multilateration, of which trilateration is one example) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
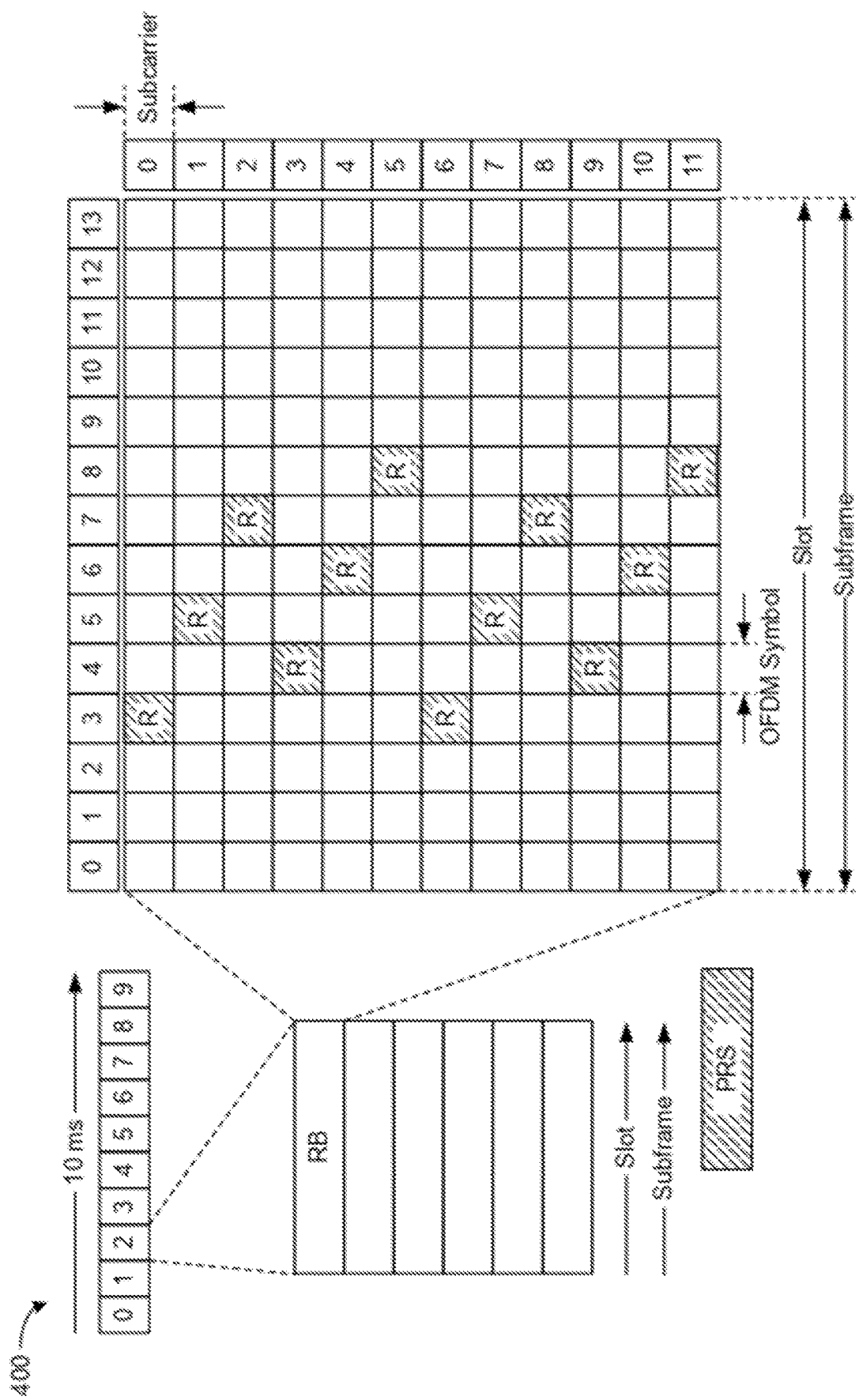
FIGS. 4A to 4D are diagrams illustrating example frame structures and channels within the frame structures, according to aspects of the disclosure.
Figure 4B:
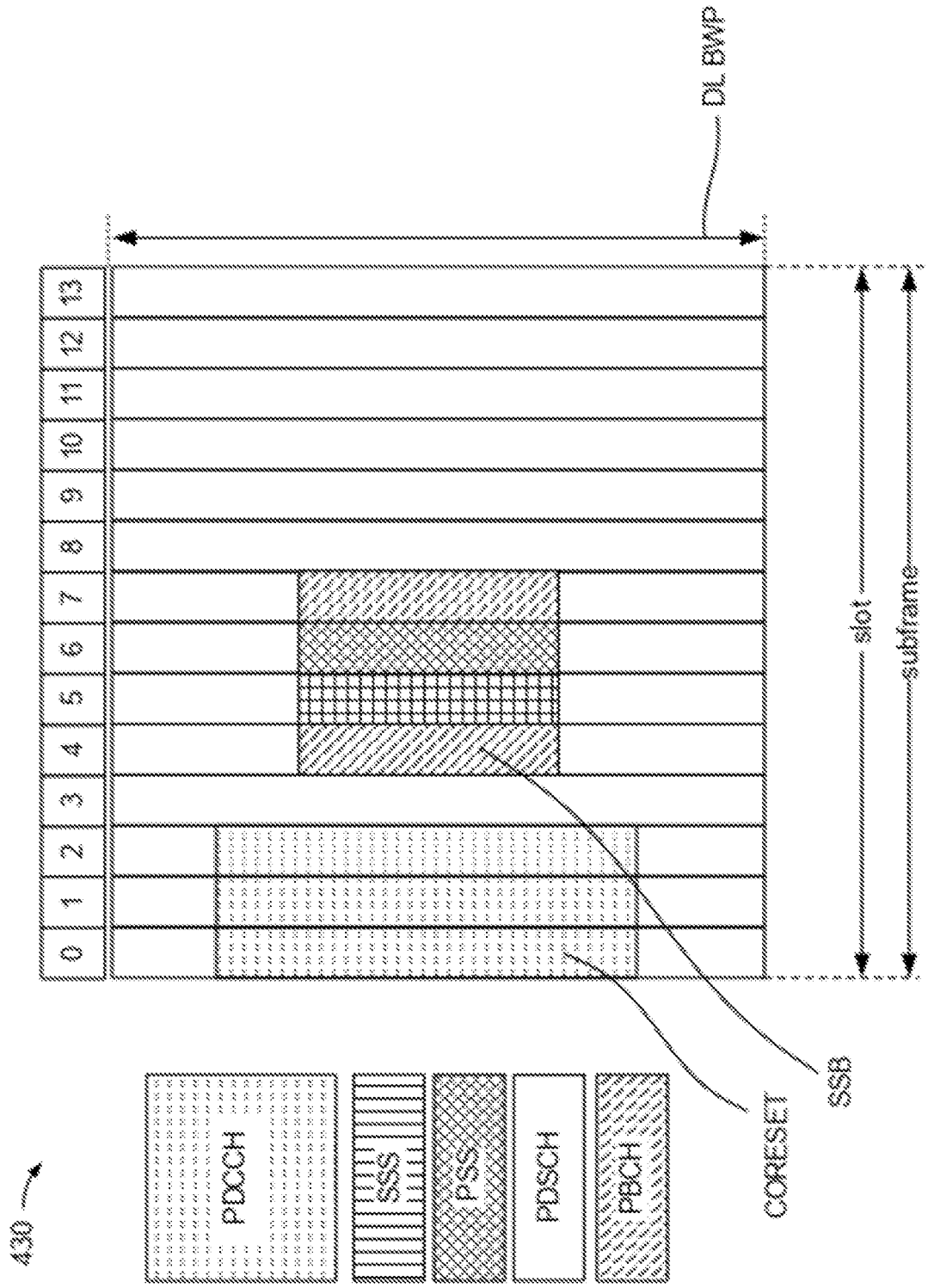
Figure 4C:
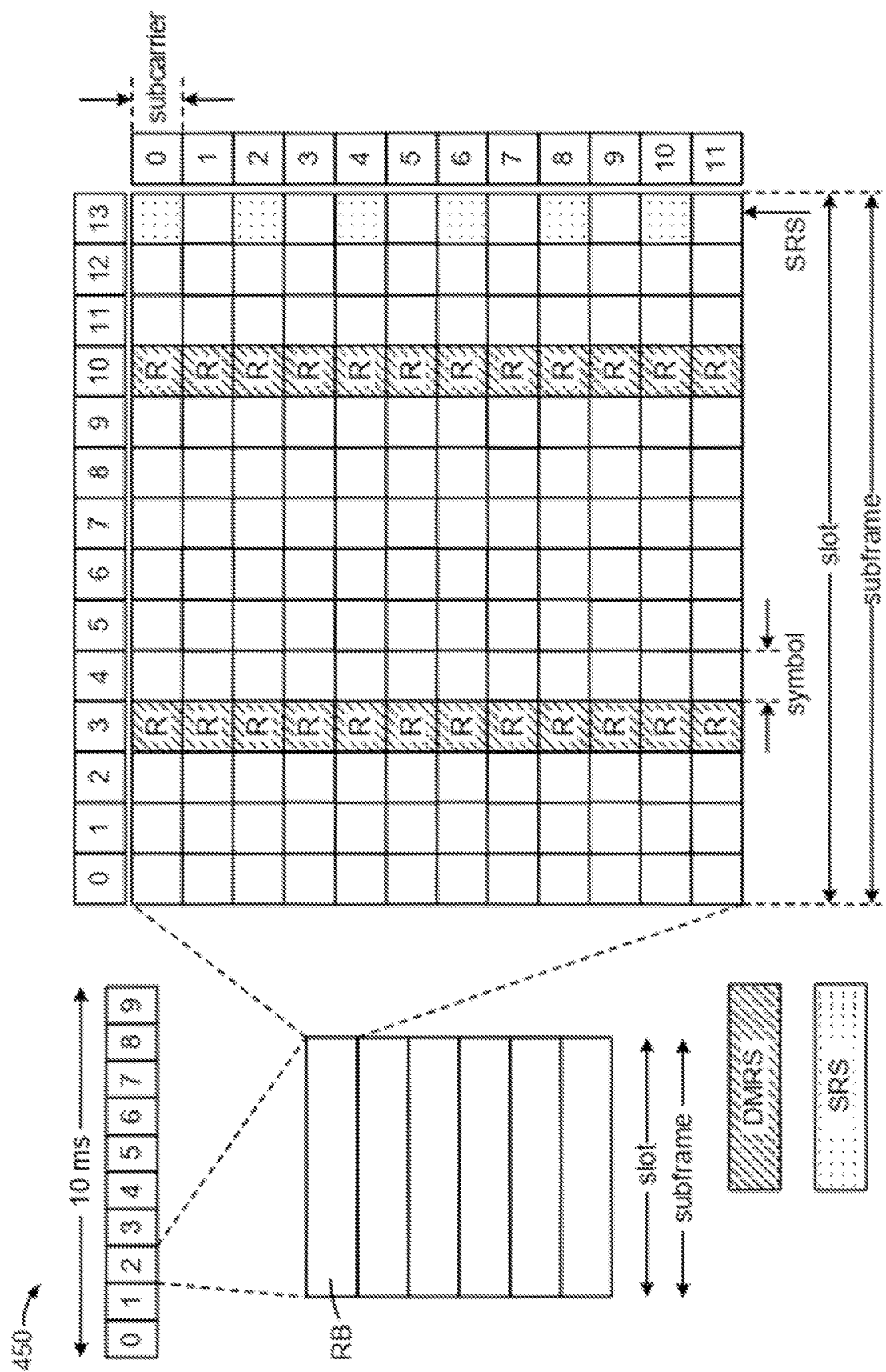
Figure 4D:
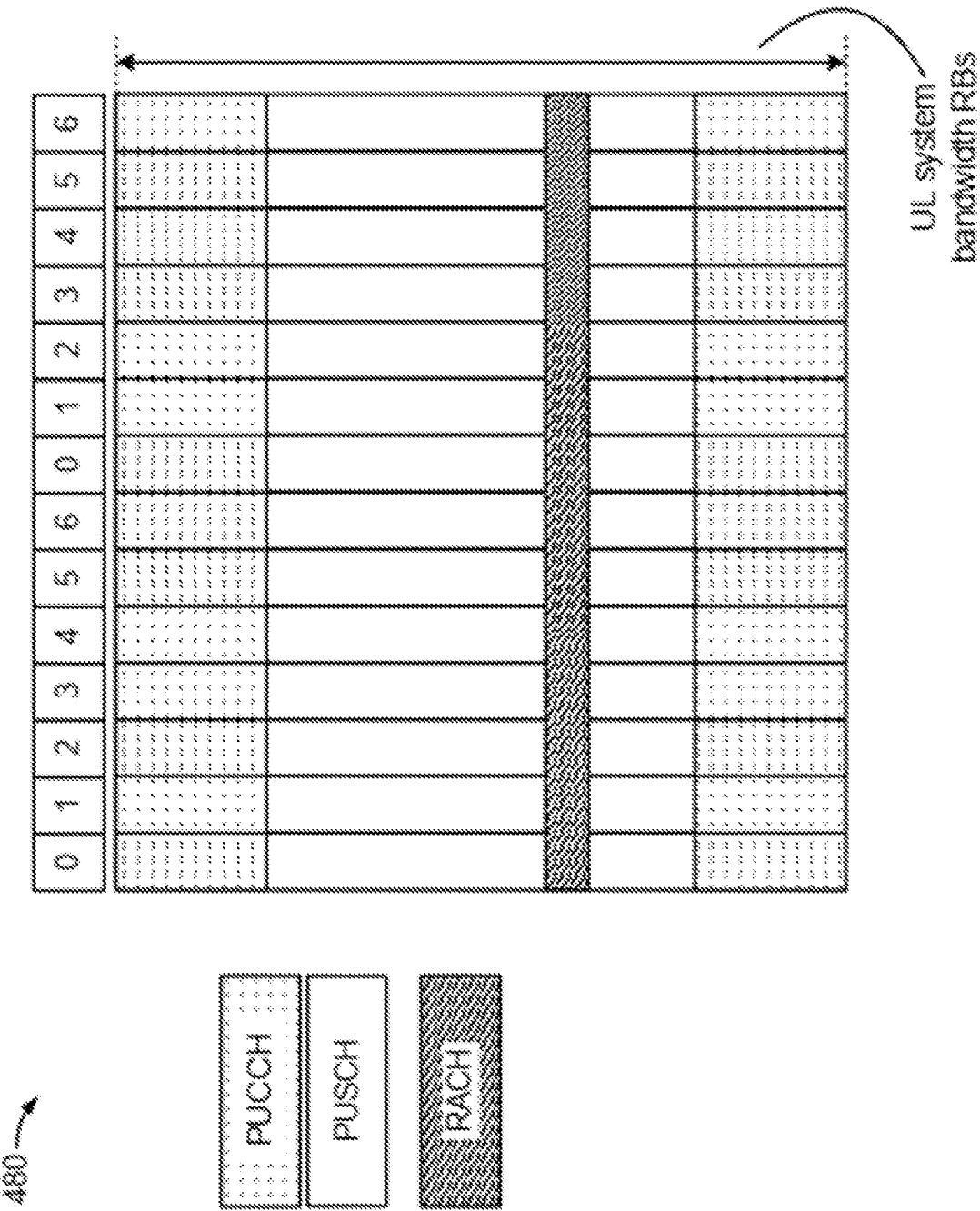

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 470 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (µ), for example, subcarrier spacings of 15 kHz (µ=0), 30 kHz (µ=1), 60 kHz (µ=2), 120 kHz (µ=3), and 240 kHz (µ=4) or greater may be available. In each subcarrier spacing, there are 14 symbols per slot. For 15 kHz SCS (µ=0), there is one slot per subframe, 10 slots per frame, the slot duration is 1 millisecond (ms), the symbol duration is 66.7 microseconds (µs), and the maximum nominal system bandwidth (in MHz) with a 4K FFT size is 50. For 30 kHz SCS (µ=1), there are two slots per subframe, 20 slots per frame, the slot duration is 0.5 ms, the symbol duration is 33.3 µs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration.

Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with μ=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of" one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 4-symbol comb-2: {0, 1, 0, 1}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS also can be used as uplink positioning reference signals for uplink positioning procedures, such as UL-TDOA, multi-RTT, DL-AoA, etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
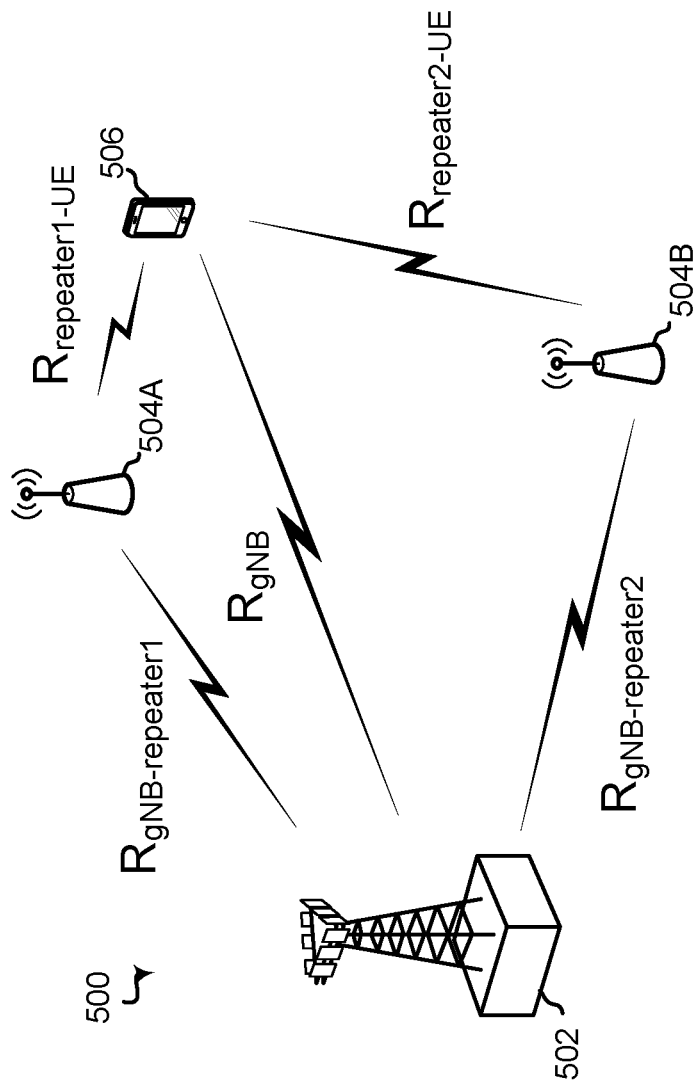
FIG. 5 illustrates an example wireless communication system with transmission paths from a BS to a UE involving a repeater according to one or more aspects.

FIG. 5 illustrates an example wireless communication system with transmission paths from a BS to a UE involving a repeater according to one or more aspects. A user equipment (UE) 506 communicates with a base station (BS) 502 as described, for example, with the system 100 of FIG. 1. The UE 506 may receive a transmission directly from the BS 502 along path $R_{gNB}$. Repeaters 504A-B may be positioned near BS 502 to retransmit a signal from BS 502. For example, each of the repeaters 504A-B may receive a signal from the BS 502 along paths $R_{gNB\text{-}repeater1}$ and $R_{gNB\text{-}repeater2}$, respectively. The repeaters 504A-B may retransmit the signal, which may be received by UE 506 along paths $R_{repeater1\text{-}UE}$ and $R_{repeater2\text{-}UE}$ from repeaters 504A-B, respectively. The repeaters 504A-B may be used to extend the range of the signals from the BS 502 beyond that available at the transmission power levels available at the BS 502. The repeaters 504A-B may be devices that receive signals from the BS 502 and re-transmit without performing other network functions, such as scheduling of network resources and/or managing of connections or airwaves in the network. In some embodiments, one or more of the repeaters 504A-B may be a reconfigurable intelligent surface (RIS), such as a smart radio surface with many small antennas or reflecting metamaterial elements that receive and relay electromagnetic (EM) waves with the capability of controlling the phase-shifts. In some embodiments, one or more of the repeaters 504A-B may be controlled, such as between an on and off state, by the BS 502. In some embodiments, the repeaters 504A-B provide beamforming, whereas in other embodiments the repeaters 504A-B do not provide beamforming.

The UE 506 or the BS 502 may perform a positioning operation for many different reasons, such as to determine the user's location during an emergency 911 (e911) call, to determine the user's location to provide driving instructions, to determine the user's location for hand-off to other networks or cells, and/or to determine the user's location for assigning network resources. Conventionally, the UE 506 may use the signals transmitted by and/or the location of the BS 502 to assist with determining a location for the user. The use of repeaters, such as repeaters 504A-B of FIG. 5, may improve communications capabilities, such as through enhancing radio coverage and/or boosting data rates. However, the addition of repeaters 504A-B introduces new challenges and issues for positioning purposes because the UE 506 may be unaware, for example, that the signal received along path $R_{repeater2\text{-}UE}$ came from the repeater 504B and not the base station 502 (e.g., a multipath reflect of the signal transmitted from the base station 502)). Positioning enables many radio-based services, and embodiments described herein may improve positioning by using the presence of the repeaters 504A-B in the location determination.

The locations of the repeaters 504A-B and/or the BS 502 along with signal characteristics of signals received along one or more of the signal paths $R_{gNB}$, $R_{repeater1\text{-}UE}$, $R_{repeater2\text{-}UE}$, $R_{gNB\text{-}repeater1}$, and/or $R_{gNB\text{-}repeater2}$ may be used to assist in the determination of the location of the UE 506. The retransmission of the signal from the BS 502 by one or more repeaters 504A-B changes the actual path of the signal to the UE 506. That is, rather than the signal reaching the UE 506 along path $R_{gNB}$, as would be assumed by the UE 506, the signal reaches the UE 506 along one of paths $R_{repeater1\text{-}UE}$ or $R_{repeater2\text{-}UE}$. The measurement for assisting the UE 506 in positioning may thus be $R_{gNB\text{-}repeater1}+R_{repeater1\text{-}UE}$ or $R_{gNB\text{-}repeater2}+R_{repeater2\text{-}UE}$. The measurement of the last path, either $R_{repeater1\text{-}UE}$ or $R_{repeater2\text{-}UE}$, may define an ellipse on which the UE 506 is located defined by focus points corresponding to locations of the BS 502 and the corresponding repeater 504A-B. Determining the location of the UE 506 depends upon determining that the signal received along paths $R_{repeater1\text{-}UE}$ or $R_{repeater2\text{-}UE}$ are received from a repeater rather than a multi-path reflection of the signal along path $R_{gNB}$.

The UE 506 may measure a signal received along the path to the BS 502 and a signal received along the path to one or more of the repeaters 504A-B and the separate measurements may be used to provide a determination of location as part of a positioning operation. One or more signal measurements with a repeater in an "on" state may produce a measurement associated with the path from the one of the repeaters 504A-B. One or more signal measurements with a repeater in an off state may produce a measurement associated with the path from the BS 502. Signal measurements associated with the path from the BS 502, such as measurement of the path from the BS 502, may provide useful information for determining a location even when the signal quality from the BS 502 is otherwise too low such that one of repeaters 504A-B is used to improve signal reception by the UE 506. The UE 506 may be configured by the BS 502 with a command to perform signal measurements corresponding to measurements associated with the path to a repeater and the BS 502 by scheduling separate measurements during a first time when the repeater is on and also separately during a second time when the repeater is off. The BS 502 may control the repeaters 504A-B to turn on and off corresponding to the scheduled signal measurements. In this manner, the UE 506 may be unaware of whether it is measuring a signal path to the repeaters 504A-B or the BS 502. One operation of scheduling the signal measurements is illustrated in the embodiment of FIG. 6.

Figure 6:
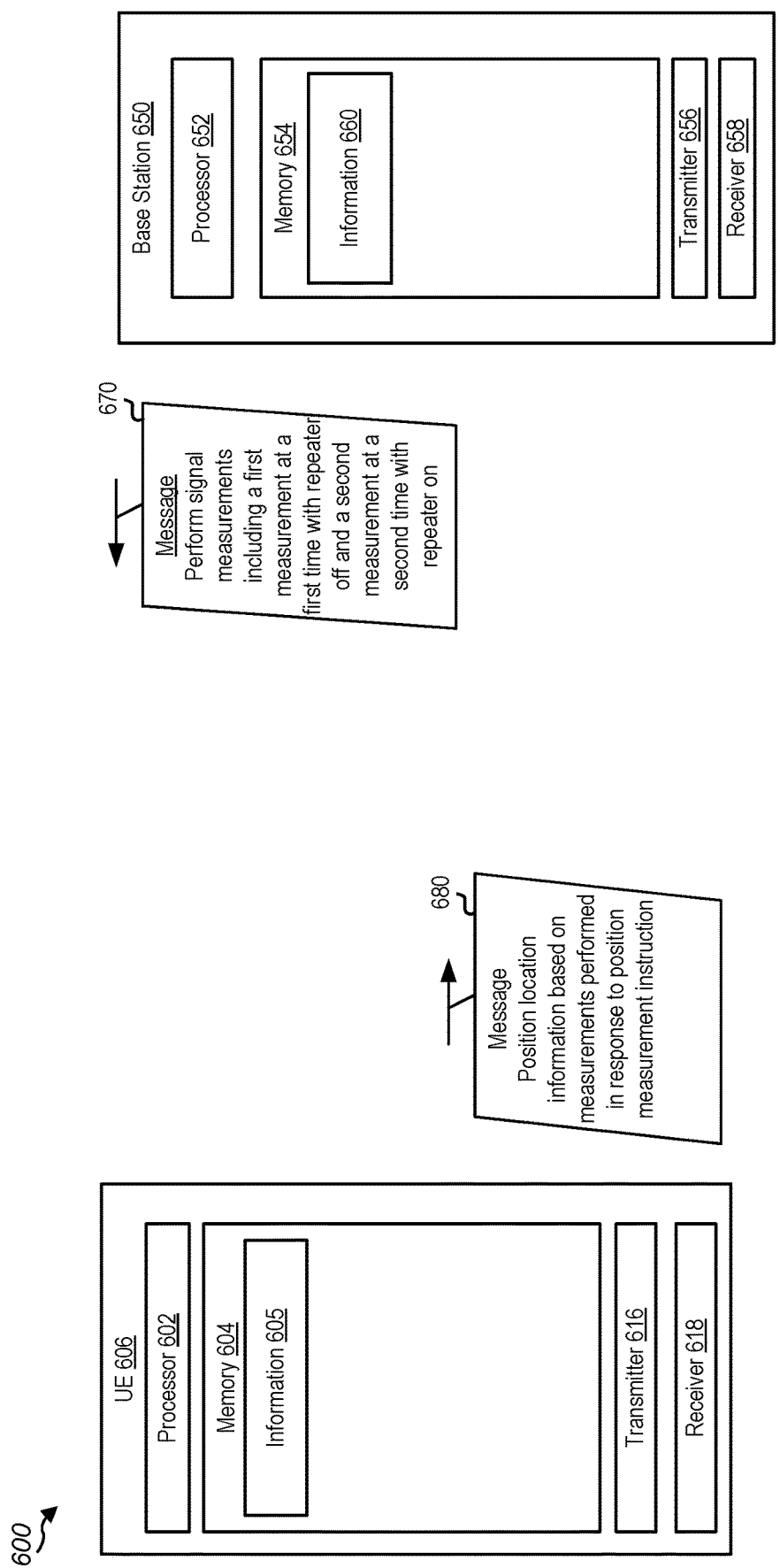
FIG. 6 is a block diagram of an example wireless communications system that supports enhanced positioning using a repeater according to one or more aspects.

FIG. 6 is a block diagram of an example wireless communications system 600 that supports enhanced positioning using a repeater according to one or more aspects. In some examples, wireless communications system 600 may implement aspects of wireless network 100 and/or wireless network 500. Wireless communications system 600 includes UE 606 and base station 650. Although one UE 606 and one base station 650 are illustrated, in some other implementations, wireless communications system 600 may generally include multiple UEs 606, and may include more than one base station 650, and may further include other components not shown, such as a location server (e.g., LMF).

UE 606 may include a variety of components (such as structural, hardware components) used for carrying out one or more functions described herein. For example, these components may include one or more processors 602 (hereinafter referred to collectively as "processor 602"), one or more memory devices 604 (hereinafter referred to collectively as "memory 604"), one or more transmitters 616 (hereinafter referred to collectively as "transmitter 616"), and one or more receivers 618 (hereinafter referred to collectively as "receiver 618"). Processor 602 may be configured to execute instructions stored in memory 604 to perform the operations described herein. In some implementations, processor 602 includes or corresponds to one or more of a receive processor, transmit processor, and controller, and memory 604.

Memory 604 includes or is configured to store scheduling information for the UE 606, instructions for processing scheduling messages received from the base station 650, instructions for performing signal measurements, results of signal measurements performed by the UE 606 such as signal characteristics corresponding to signals received from a repeater and signal received from the BS 650, and/or instructions for determining a location of the UE 606 based on the signal measurements.

Transmitter 616 is configured to transmit reference signals, control information and data to one or more other devices, and receiver 618 is configured to receive references signals, synchronization signals, control information and data from one or more other devices. For example, transmitter 616 may transmit signaling, control information and data to, and receiver 618 may receive signaling, control information and data from, base station 650. In some implementations, transmitter 616 and receiver 618 may be integrated in one or more transceivers. Additionally or alternatively, transmitter 616 or receiver 618 may include or correspond to one or more components of UE 104 described with reference to FIG. 1.

Base station 650 may include a variety of components (such as structural, hardware components) used for carrying out one or more functions described herein. For example, these components may include one or more processors 652 (hereinafter referred to collectively as "processor 652"), one or more memory devices 654 (hereinafter referred to collectively as "memory 654"), one or more transmitters 656 (hereinafter referred to collectively as "transmitter 656"), and one or more receivers 658 (hereinafter referred to collectively as "receiver 658"). Processor 652 may be configured to execute instructions stored in memory 654 to perform the operations described herein. In some implementations, processor 652 includes or corresponds to one or more of a receive processor, transmit processor, and controller.

Memory 654 includes or is configured to store scheduling configurations for the UE 606 and other UEs attached to the base station 650, instructions for transmitting scheduling information to the UE 606 and other UEs, instructions for receiving and processing signal measurements from the UE 606 and other UEs, instructions for determining a location of the UE 606 based on the received signal measurements, and/or instructions for communicating with a location server 172, such as according to the communications system described in embodiments shown in FIG. 2A and FIG. 2B. Memory 654 may store information 660, such as a physical location of the base station 650 and one or more repeaters and/or signal measurements and/or US location information received from the UE.

Transmitter 656 is configured to transmit reference signals, synchronization signals, control information and data to one or more other devices, and receiver 658 is configured to receive reference signals, control information and data from one or more other devices. For example, transmitter 656 may transmit signaling, control information and data to, and receiver 658 may receive signaling, control information and data from, UE 606. In some implementations, transmitter 656 and receiver 658 may be integrated in one or more transceivers. Additionally or alternatively, transmitter 656 or receiver 658 may include or correspond to one or more components of base station 102 described with reference to FIG. 1.

In some implementations, wireless communications system 600 implements a 5G NR network. For example, wireless communications system 600 may include multiple 5G-capable UEs 606 and multiple 5G-capable base stations 650, such as UEs and base stations configured to operate in accordance with a 5G NR network protocol such as that defined by the 3GPP.

During operation of wireless communications system 600, the base station 650 may transmit a message 670 to the UE 606 to schedule the UE 606 to perform signal measurements including a first measurement at a first time corresponding to a time the repeater is off and a second measurement at a second time corresponding to a time the repeater is on. The baes station 650 may transmit a corresponding instruction to a repeater to turn on and off at the first and second times corresponding to the scheduled UE 606 signal measurements. The UE 606 may perform the measurements and transmit a message 680 to the base station 650 after performing the instructed operations in message 670. The reply message may include different data depending on a type of positioning operation performed.

In a UE-based positioning operation, the UE 606 performs the location determination. For example, UE 606 may receive location assistance data in message 670 or another message. The location assistance data may include a location of the repeater and/or the base station 650, such that the UE 606 may determine a location of the UE 606 based on the first signal measurement made at the first time with the repeater off and the second signal measurement made at the second time with the repeater on. The UE 606 may then transmit to base station 650 in reply message 680 the UE-determined location, and the base station 650 may store the location or transmit the location to a location server. In some embodiments, the message 680 may also carry the signal characteristics measured by the first and second signal measurements. In some embodiments, the UE-determined location in message 680 may be based on assistance data provided by a location server (e.g., LMF) via the base station 650. The location server may configure assistance data including PRS configuration information and other assistance data, such as the base station almanac, and provide the assistance data to the UE 606 via the serving base station 650.

Although the message 680 is shown as including position location information, that position location information may be measurements used to determine a position location. For example, in a UE-assisted positioning operation, the UE 606 may transmit in message 680 the signal measurements made by the UE as instructed in message 670. The message 680 may carry the signal characteristics measured by the first and second signal measurements. The base station 650 and/or other network side entities, such as a location server, may determine the location of the UE 606 based on the results of the first and second signal measurements contained in message 680 and other available data. In some embodiments, a subsequent message from the base station 650 to the UE 606 may convey the determined location to the UE 606. In some embodiments, the UE 606 reports signal measurements in message 680 to a location server by transmitting the message 680 to the base station 650. The location server may receive the measurements from the UE 606 and other UEs and perform location determination in the UE-assisted mode, and communicate a determined location back to the UE 606 through the base station 650.

As described with reference to FIG. 6, the present disclosure provides techniques for improving positioning operations for determining a geographical location of a UE within a cell of a wireless communications network. The use of a repeater can extend the signal from the base station and improve data rates for connected UEs without increasing deployment and operating costs by building additional base stations. The use of repeaters may thus be beneficial in a wireless communication network. However, because the UE may not know that a received signal is repeated from rather than generated by the source of the received transmission, positioning operations for the UE may lead to incorrect location determinations. Providing instructions to the UE to perform signal measurements for a positioning operation at specific times during which the repeater is on or off may result in measurements that assist with the location determination. Further, the precision of the UE location may be improved by using two or more signal measurements, in which one of the signal measurements is on a signal transmitted from a base station and one of the signal measurements is on a signal transmitted from a repeater on behalf of the base station. Two or more signal measurements from two or more geographically diverse signal source locations (e.g., the base station and a repeater) can improve trilateration (e.g., through TOA, TDOA, OTDOA, RTT, multi-cell RTT techniques) and/or triangulation during determination of the UE location.

Figure 7:
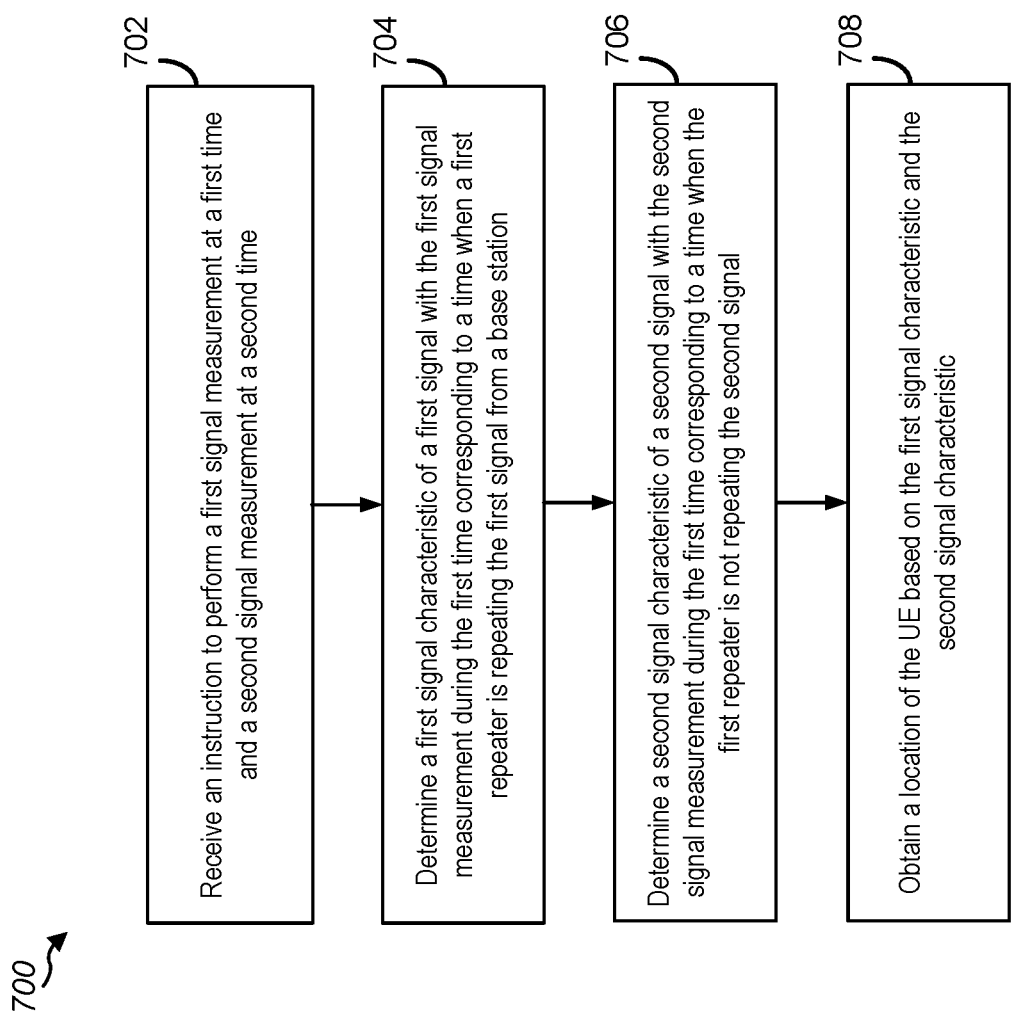
FIG. 7 is a flow diagram illustrating an example process that supports enhanced positioning using a repeater according to one or more aspects.

FIG. 7 is a flow diagram illustrating an example method 700 that supports enhanced positioning using a repeater according to one or more aspects. Operations of method 700 may be performed by a UE, such as UE 104 described above with reference to FIG. 1 or UE 606 described above with reference to FIG. 6. For example, example operations (also referred to as "blocks") of method 700 may enable UE 606 to support enhanced positioning operations for determining a location of the UE with a repeater.

In block 702, the UE receives an instruction to perform a first signal measurement at a first time and a second signal measurement at a second time. Block 702 may be conveyed to the UE in a single message instructing two or more signal measurements or conveyed to the UE in multiple messages, each instructing separate signal measurements be performed at different times. In some implementations, the instruction may be a message from which the UE may determine a first time and a second time for signal measurements, although such measurements are not explicitly stated in the instruction. For example, the signal measurement at particular times may be a result of a particular configuration assigned to the UE in a configuration message, which may be part of the assistance data the UE receives from the base station or the location server via the base station. In some implementations, two separate instructions may be received corresponding to two instructions to perform the first and second signal measurements, respectively.

In block 704, the UE determines a first signal characteristic of a first signal during the first time corresponding to a time when a first repeater is repeating the first signal from a base station. The determination of the first signal characteristic may include a determination, such as by measurement of at least one of a signal strength, a time of arrival (e.g., TOA, TDOA, etc.), a range estimate, an angle of departure, or an angle of arrival, or any combinations thereof, of a first signal received by the UE. The first signal may be a signal received from the first repeater as a result of the repeater being on (e.g., in an "on" state) and repeating the first signal from the base station during the first time corresponding to the first measurement. The signal measurement of block 704 may be performed on a positioning reference signal (PRS) or other signal, such as those described above with reference to FIGS. 1-4.

In block 706, the UE determines a second signal characteristic of a second signal during the second time corresponding to a time when the first repeater is not repeating the second signal (such as when the first repeater is off or in an "off" state). The determination of the second signal characteristic may include a determination, such as by measurement of at least one of a signal strength, a time of arrival (e.g., TOA, TDOA, etc.), a range estimate, an angle of departure, or an angle of arrival, or any combinations thereof, of a second signal received by the UE. The second signal may be a signal received from the base station as a result of the repeater being off during the second time corresponding to the second measurement. The signal measurement of block 706 may be performed on a positioning reference signal (PRS) or other signal, such as those described above with reference to FIGS. 1-4.

In block 708, the UE obtains a position of the UE, wherein the position is based on the first signal characteristic and the second signal characteristic. In some implementations, such as during a UE-assisted positioning operation, the UE determines the position by receiving and decoding a message from the base station containing the position. That position may have been determined on the network side after transmitting the first and second signal characteristics from the UE to the BS or to the location server via the BS. In some implementations, such as during a UE-based positioning operation, the UE determines the position by processing the first and second determined signal characteristics.

The UE, the base station, the location server, and/or a combination thereof may determine the UE location based on the first signal characteristics determined during the first signal measurement and the second signal characteristic determined during the second signal measurement. The determination may be based on one or more rules that define the manner of determining the location. For example, determining the location may include determining the location based on the first signal characteristic when first criteria are met; determining the location based on the second signal characteristic when second criteria are met; and determining the location based on the first signal characteristic and the second signal characteristic when third criteria are met. In other implementations, fewer or additional criteria may be used in determining the UE location. In some example embodiments, the first criteria specifies a signal strength for the first signal characteristic being below a first threshold, the second criteria specifies a signal strength for the second signal characteristic being below a second threshold, and the third criteria specifies signal strengths for the first signal characteristic and the second signal characteristic being above a third threshold. For example, when signal strengths for signals received from the BS and the repeater are both above a threshold, the UE location determination may be based on both signal characteristics.

When the location of the UE is determined at the UE, assistance data may be provided to the UE prior to the determination at block 708, such as by including assistance data in the instruction received at block 702 and/or transmitting the assistance data prior to the blocks 702, 704, 706, and 708. The assistance data may include one or more repeater parameters regarding the repeater, and the location determination at block 708 may be based on the one or more repeater parameters. These repeater parameters may include one or more of a position of the first repeater, an orientation of the first repeater, a range from the first repeater to a base station, and/or a delay introduced by the first repeater. The assistance data may provide different parameters for different carrier frequencies, bandwidth, and other airwave configuration details. The assistance data may be broadcast as part of system information and may be used for other purposes in addition to the positioning operation in the method 700.

The determination of the location of the UE whether the positioning is performed at the UE or at the network may be enhanced by measurement of a third signal received from the first repeater or additional second or further repeaters. The UE may be instructed to perform a third signal measurement during a third time corresponding to a time when a second repeater is repeating the base station signal as a third signal. The instruction to measure the third signal may be transmitted in the same message for instructing the first and second measurements of blocks 704 and 706. In some implementations, a location may be determined at block 708, and when a confidence level or precision of the determination location is below a threshold, the UE may be instructed to perform a third signal measurement to enhance the confidence and/or precision of the location determination.

In some implementations, multipath components may be determined from the signal measurements and used in the determination of the location. For example, when the repeater is on the UE may receive a signal from the repeater and a corresponding signal from the base station, which represents multiple paths for the signal. Measurements of multipath signals may be used with multiple taps. For example, two taps may be configured to report two corresponding measurements for a single signal transmitted by the base station and repeated by the repeater. The base station path may arrive first and a signal characteristic associated with the path determined by a first tap, and a second tap configured to determine a signal characteristic of the repeater path. The multi-path measurement may be measured, for example during the signal characteristic determination of block 704 and determined signal characteristics of the multiple paths used in determining a location of the UE at block 708, by the UE during UE-based positioning or transmitted to the base station during UE-assisted positioning.

The method 700 may be performed for signal measurements on uplink channels for uplink-based positioning and/or on downlink channels for downlink-based positioning. For example, uplink-based positioning may include the network configuring the UE with two uplink positioning signal (SRS) times, in which the first SRS time is with the repeater off and the second SRS time is with the repeater on. The network may then use both measurements on the SRS times to determine which signal(s) to consider for determining the location in the positioning session.

Figure 8:
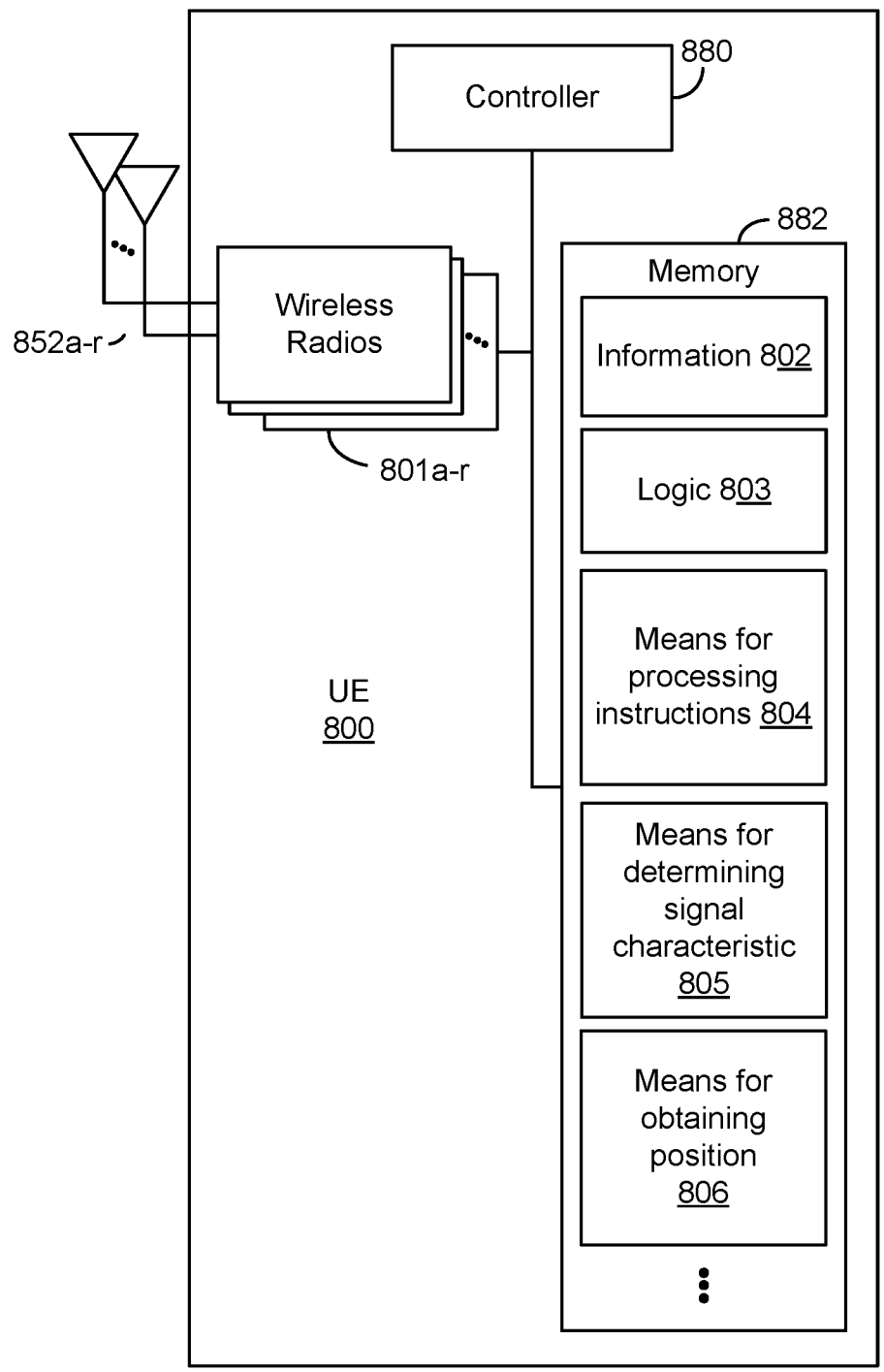
FIG. 8 is a block diagram of an example UE that supports enhanced positioning with a repeater according to one or more aspects.

FIG. 8 is a block diagram of an example UE 800 that supports enhanced positioning with a repeater according to one or more aspects. UE 800 may be configured to perform operations, including the blocks of a process described with reference to FIG. 7. In some implementations, UE 800 includes the structure, hardware, and components shown and described with reference to UE 104 of FIG. 1 or UE 606 of FIG. 6. For example, UE 800 includes a controller 880, which operates to execute logic or computer instructions stored in memory 882, as well as controlling the components of UE 800 that provide the features and functionality of UE 800. UE 800, under control of a controller or other logic circuitry, transmits and receives signals via wireless radios 801a-r and antennas 852a-r. Wireless radios 801a-r include various components and hardware, including one or more modulator and demodulators, a MIMO detector, a receive processor, a transmit processor, and/or TX MIMO processor.

Figure 10:
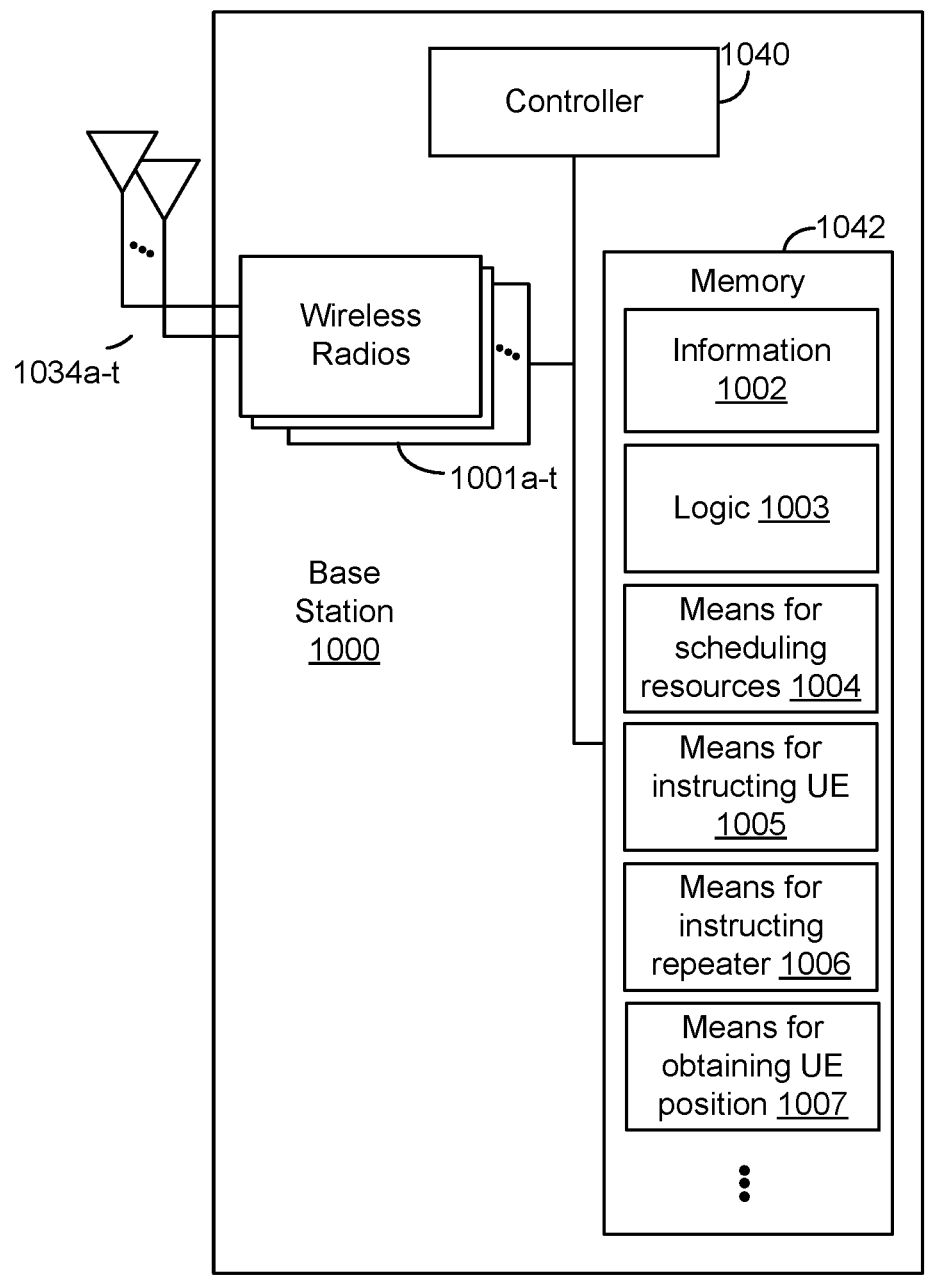
FIG. 10 is a block diagram of an example base station that supports enhanced positioning with a repeater according to one or more aspects.

As shown, memory 882 may include information 802, logic 803, means 804 for processing instructions, means 805 for determining a signal characteristic, means 806 for obtaining a position. Logic 503 may be configured to process instructions and cause the controller 880 to control the wireless radios 801a-r for transmission on antennas 852a-r in accordance with received instructions from a base station and predetermined routings for operating on a wireless network. Means 804 for processing instructions may be logic, either general-purpose or special-purpose circuitry, configured to decode instructions received by the wireless radios 801a-r. Means 805 for determining a signal characteristic may be logic, either genera-purpose or special-purpose circuitry, configured to receive information from the wireless radios 801a-r regarding received signals and/or radio frequency (RF) or baseband (BB) circuitry configured to perform measurements and obtain signal characteristics of signals received by antennas 852a-r. UE 800 may receive signals from or transmit signals to one or more network entities, such as base station 102 of FIG. 1, a repeater as illustrated in FIG. 5, or a base station as illustrated in FIG. 10.

Figure 9:
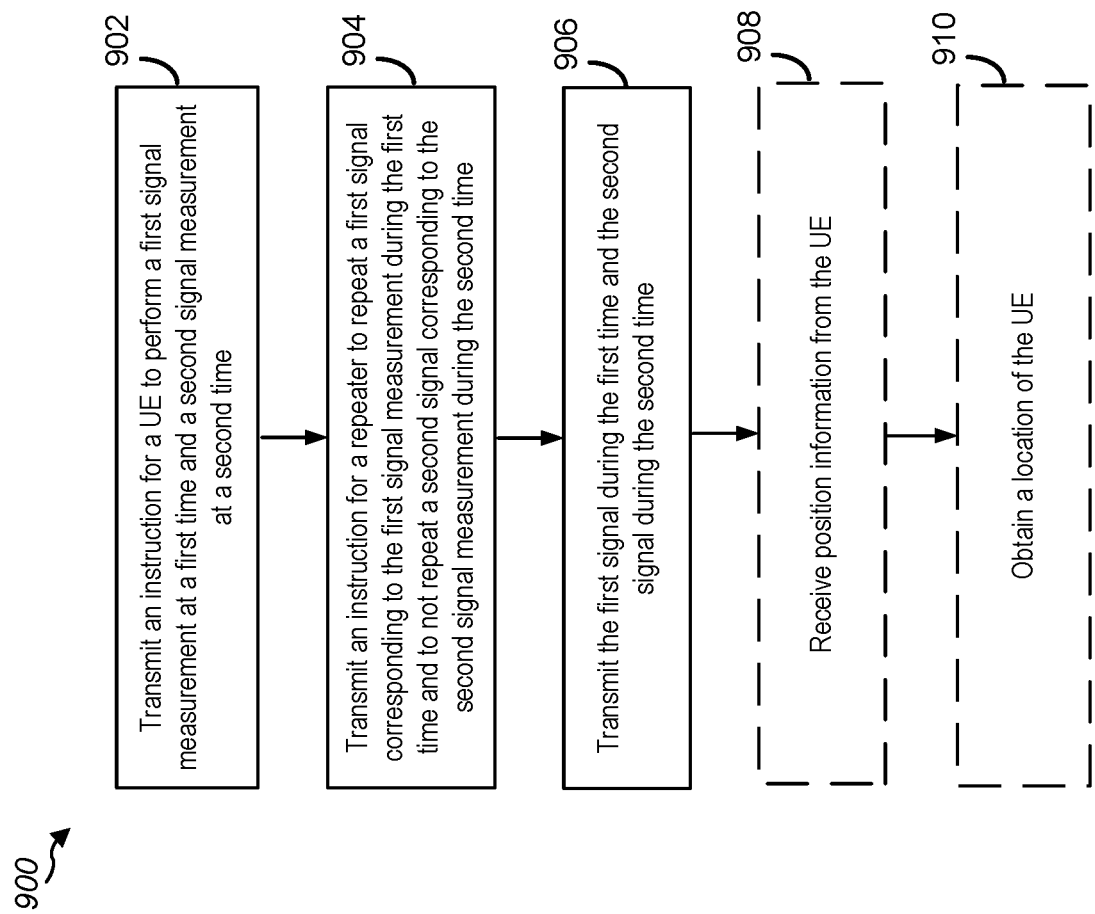
FIG. 9 is a flow diagram illustrating an example process that supports enhanced positioning with a repeater according to one or more aspects.

FIG. 9 is a flow diagram illustrating an example method 900 that supports enhanced positioning with a repeater according to one or more aspects. Operations of method 900 may be performed by a base station, such as base station 102 described above with reference to FIG. 1 or a base station as described above with reference to FIG. 6. For example, example operations of method 900 may enable base station 102 to support enhanced positioning operations for a UE with a repeater.

At block 902, the base station transmits an instruction for a UE to perform a first signal measurement at a first time and a second signal measurement at a second time. The instructed signal measurements may be performed at predetermined intervals or may be triggered based on a positioning operation started based on a request for the UE's location either by the UE or the network. In some implementations, the signal measurements may be instructed at predetermined intervals and a separate instruction transmitted if a positioning operation is begun and the previous signal measurements are stale or otherwise invalid for the current state of the UE. The instruction to perform the first and second signal measurements may specify determining at least one of a range estimate (e.g., TOA, TDOA, RTT), angle of departure, or angle of arrival of the first signal and the second signal, in which the signal characteristic measured for the first signal and second signal may be the same or different characteristics. In some implementations, the instruction may be a message from which the UE may determine a first time and a second time for signal measurements, although such measurements are not explicitly stated in the instruction. For example, the signal measurement at particular times may be a result of a particular configuration assigned to the UE in a configuration message.

At block 904, the base station transmits an instruction for a repeater to repeat a first signal originating from the base station corresponding to the first signal measurement during the first time and to not repeat a second signal originating from the base station corresponding to the second signal measurement during the second time. The turning on and turning off of the repeater may be scheduled during times when there is no scheduled traffic in the cell, when there is no scheduled traffic for UEs in the vicinity of the repeater within the cell, when there is only scheduled control traffic in the cell, and/or when there is traffic that can be rescheduled for another time such that the repeater can be disabled. Turning off the repeating function, such as when there is no scheduled traffic for connected UEs, reduces or eliminates the loss of functionality within the cell caused by turning off the repeating. In some embodiments, the turning on and off at block 904 of the repeater may instruct the entire repeater to turn off or enter standby mode or cause the disabling of a portion of the repeater. For example, the repeater may continue repeating some signals while not repeating the second signal during the second time. In some embodiments, the turning off of the repeater is such that the serving cell makes sure to not overlap data transmission for other UEs in the cell while instructing the repeater to turn off. This may reduce overlap or guarantee no overlap between positioning symbols and other UE's data symbols.

At block 906, the base station transmits an instruction for a repeater to repeat a first signal corresponding to the first signal measurement during the first time and to not repeat a second signal corresponding to the second signal measurement during the second time. The transmitted first and second signals may be position reference signals (PRSs) or other reference signals (e.g., TRS, CSI-RS, SSB) including those described above. In some embodiments, the same reference signal is transmitted as the first and second signal, while in other embodiments different reference signals are transmitted as the first and second signal. For example, the PRS may be transmitted as the first signal by the base station and repeated by the repeater during the first time for the first signal measurement and the SSB may be transmitted as the second signal by the base station and not repeated by the repeater during the second time for the second signal measurement.

At block 908, the base station obtains a position of the UE based on the first signal characteristic and the second signal characteristic. In some implementations, the determination of the position in a UE-based positioning operation may involve receiving the position determined by the UE from the UE at block 908, which becomes the determined location of the UE at block 910. In some implementations, the determination of the position in UE-assisted positioning operations may involve receiving, by the BS at block 908, a measurement report comprising a first signal characteristic corresponding to the first signal measurement and a second signal characteristic corresponding to the second signal measurement. Subsequently, at block 910, the BS may determine the location of the UE based on the first signal characteristic and the second signal characteristic and/or other data. The obtaining of the location at block 910 may include the base station receiving a location from a location server that determines the location of the UE based on the position information received from the UE at block 908. Block 910 may not be implemented when the position determination is UE-based, such that the received position information at block 908 is the position. In some embodiments, the location obtained at block 910 may be determined by the BS, by a location server, or by cooperation between the BS and the location server.

In some embodiments, determining the location of the UE may include application of one or more rules based on criteria involving the first and/or second signal characteristics to determine how to determine the location based on the first and/or second signal characteristics. The rules may be transmitted to the UE, for example, as part of the transmitted instruction at block 904. For example, determining the location may include determining the location based on the first signal characteristic in response to a determination that first criteria are met; determining the location based on the second signal characteristic in response to a determination that second criteria are met; and/or determining the location based on the first signal characteristic and the second signal characteristic in response to a determination that third criteria are met. The first criteria may specify a signal strength for the first signal characteristic below a first threshold, the second criteria may specify a signal strength for the second signal characteristic below a second threshold, and the third criteria may specify signal strengths for the first signal characteristic and the second signal characteristic above a third threshold.

When the location of the UE is determined at the UE, assistance data may be provided to the UE prior to the first and second signal measurements being performed by the UE, such as by including assistance data in the instruction transmitted at block 902 and/or transmitting the assistance data prior to blocks 902, 904, 906, and 908. The assistance data may include one or more repeater parameters regarding the repeater, and the instructed signal measurements at block 902 and/or the location determination at block 908 may be based on the one or more repeater parameters. These repeater parameters may include one or more of a position of the first repeater, an orientation of the first repeater, a range from the first repeater to a base station, and/or a delay introduced by the first repeater. The assistance data may provide different parameters for different carrier frequencies, bandwidth, and other airwave configuration details. The assistance data may be broadcast as part of system information and may be used for other purposes in addition to positioning in the method 900.

The determination of the location of the UE whether the positioning is performed at the UE or at the network may be enhanced by measurement of a third signal received from a second repeater or further additional repeaters. The UE may be instructed to perform a third signal measurement during a third time corresponding to a time when a second repeater is repeating the third signal. The instruction to measure the third signal may be transmitted in the same message at block 902. In some implementations, a location may be determined at block 908, and when a confidence level or precision of the determination location is below a threshold, the UE may be instructed to perform a third signal measurement, after which the location is updated based on the third signal measurement to enhance the confidence and/or precision of the location determination.

In some implementations, multipath components may be determined from the signal measurements and used in the determination of the location. For example, the UE may receive a signal from the repeater when the repeater is on and a corresponding signal from the base station, which represents multiple paths for the signal. Measurements of multipath signals may be transmitted to the BS as part of the received position information at block 908.

FIG. 10 is a block diagram of an example base station 1000 that supports enhanced positioning with a repeater according to one or more aspects. Base station 1000 may be configured to perform operations, including the blocks of method 900 described with reference to FIG. 9. In some implementations, base station 1000 includes the structure, hardware, and components shown and described with reference to base station 102 of FIG. 1. For example, base station 1000 may include controller 1040, which operates to execute logic or computer instructions stored in memory 1042, as well as controlling the components of base station 1000 that provide the features and functionality of base station 1000. Base station 1000, under control of controller 1040, transmits and receives signals via wireless radios 1001*a-t* and antennas 1034*a-t*. Wireless radios 1001*a-t* may include various components and hardware, including one or more modulators and demodulators, a transmit processor, a TX MIMO processor, a MIMO detector, and/or a receive processor.

As shown, the memory 1042 may include information 1002, logic 1003, and means 1004 for scheduling resources within the wireless communication network, such as within the cell corresponding to the base station 1000. Means 1005 for instructing UEs may be configured to generate instruction messages for transmission through the wireless radios 1001*a-t* to UEs for instructing the UE to perform first and second signal measurements during first and second times. Means 1006 for instructing repeaters may be configured to transmit instructions on control channels to repeaters, such as within the cell corresponding to the base station 1000, for turning the repeating of signals on and off during the first and second time of the first and second signal measurements. Means 1007 for obtaining UE position may be configured to receive signal characteristics from the UE and determine the location of the UE, which may include logic for communicating with a separate location server that performs or assists in the location determination. Base station 1000 may receive signals from or transmit signals to one or more UEs, such as UE 104 of FIG. 1 or UE 800 of FIG. 8.

It is noted that one or more blocks (or operations) described with reference to FIGS. 7 and 9 may be combined with one or more blocks (or operations) described with reference to another of the figures. For example, one or more blocks (or operations) of FIG. 7 may be combined with one or more blocks (or operations) of FIG. 9. As another example, one or more blocks associated with FIGS. 7 and 9 may be combined with one or more blocks (or operations) associated with FIGS. 1-5. Additionally, or alternatively, one or more operations described above with reference to FIGS. 1-5 may be combined with one or more operations described with reference to FIG. 8 or 10.

In one or more aspects, techniques for supporting position determination operations may include additional aspects, such as any single aspect or any combination of aspects described below or in connection with one or more other processes or devices described elsewhere herein. In a first aspect, supporting positioning operations may include an apparatus configured to receive, by the UE, an instruction to perform a first signal measurement at a first time and a second signal measurement at a second time. The apparatus is further configured to determine, by the UE and based on the instruction, a first signal characteristic of a first signal during the first time corresponding to a time when a first repeater is repeating the first signal from a base station. The apparatus is also configured to determine, by the UE and based on the instruction, a second signal characteristic of a second signal during the second time corresponding to a time when the first repeater is not repeating the second signal. The apparatus is further configured to obtain a location of the UE based on the first signal characteristic and the second signal characteristic. Additionally, the apparatus may perform or operate according to one or more aspects as described below. In some implementations, the apparatus includes a wireless device, such as a UE. In some implementations, the apparatus may include at least one transceiver, at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, to determine the first signal characteristic, the at least one processor is configured to determine at least one of a range estimate, angle of departure, or angle of arrival of the first signal; and to determine the second signal characteristic, the at least one processor is configured to determine at least one of a range estimate, angle of departure, or angle of arrival of the second signal.

In a third aspect, alone or in combination with one or more of the first aspect or the second aspect, the UE is configured to transmit, by the UE, a measurement report comprising the first signal characteristic and the second signal characteristic; and receive, by the UE from the BS, the location determined based on the first signal characteristic and the second signal characteristic. In other aspects, the UE may determine the location of the UE based on the first signal characteristic, the second signal characteristic, and/or other information, such as repeater parameters.

In a fourth aspect, alone or in combination with one or more of the first aspect through the third aspect, the location obtained by the UE may be based on determining the location based on the first signal characteristic when first criteria are met; determining the location based on the second signal characteristic when second criteria are met; and determining the location based on the first signal characteristic and the second signal characteristic when third criteria are met. In some embodiments, the UE may determine the location based on these or other criteria.

In a fifth aspect, alone or in combination with one or more of the first aspect through the fourth aspect, the first criteria comprises a signal strength for the first signal characteristic below a first threshold, wherein the second criteria comprises a signal strength for the second signal characteristic below a second threshold, and wherein the third criteria comprises signal strengths for the first signal characteristic and the second signal characteristic above a third threshold.

In a sixth aspect, alone or in combination with one or more of the first aspect through the fifth aspect, the UE is further configured to receive one or more repeater parameters regarding the repeater, wherein determining the location of the UE is based on the one or more repeater parameters.

In a seventh aspect, alone or in combination with one or more of the first aspect through the sixth aspect, the UE is configured to receive the one or more repeater parameters by being configured to receive at least one of a location of the first repeater, an orientation of the first repeater, a range from the first repeater to a base station, or a delay introduced by the first repeater.

In an eighth aspect, alone or in combination with one or more of the first aspect through the seventh aspect, the UE is configured to receive the instruction to perform a third signal measurement during a third time, and wherein the UE is further configured to determine, by the UE and in response to receiving the instruction, a third signal characteristic of a third signal during the third time corresponding to a time when a second repeater is repeating the third signal In one or more aspects, techniques for supporting position determination may include additional aspects, such as any single aspect or any combination of aspects described below or in connection with one or more other processes or devices described elsewhere herein. In a ninth aspect, supporting positioning operations may include an apparatus configured to transmit, by the base station, an instruction for a user equipment (UE) to perform a first signal measurement at a first time and a second signal measurement at a second time. The apparatus is further configured to transmit, by the base station, an instruction for a first repeater to repeat a first signal corresponding to the first signal measurement during the first time and to not repeat a second signal corresponding to the second signal measurement during the second time. The apparatus is also configured to transmit, by the base station, the first signal during the first time and the second signal during the second time. Additionally, the apparatus may perform or operate according to one or more aspects as described below. In some implementations, the apparatus includes a wireless device, such as a base station. In some implementations, the apparatus may include at least one transceiver, at least one processor coupled to the at least one transceiver, and a memory coupled to the at least one processor. The at least one processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a tenth aspect, in combination with the ninth aspect, the instruction to perform the first signal measurement comprises an instruction to determine at least one of a range estimate, angle of departure, or angle of arrival of the first signal; and the instruction to perform the second signal measurement comprises an instruction to determine at least one of a range estimate, angle of departure, or angle of arrival of the second signal.

In an eleventh aspect, in combination with ninth aspect or the tenth aspect, the at least one processor is further configured to: receive, by the BS, a first signal characteristic corresponding to the first signal measurement and a second signal characteristic corresponding to the second signal measurement; and obtain the location of the UE, wherein the location of the UE is based on the first signal characteristic and the second signal characteristic. In some aspects, the BS may obtain the location of the UE by receiving the location from the UE; receiving the location from a location server; and/or determining, by the base station, the location of the UE based on the first signal characteristic and the second signal characteristic.

In a twelfth aspect, in combination with any one of the ninth through eleventh aspects, the location of the UE is determined based on the first signal characteristic and the second signal characteristic by: determining the location based on the first signal characteristic in response to a determination that first criteria are met, wherein the first criteria comprises a signal strength for the first signal characteristic being below a first threshold; determining the location based on the second signal characteristic in response to a determination that second criteria are met, wherein the second criteria comprises a signal strength for the second signal characteristic being below a second threshold; and determining the location based on the first signal characteristic and the second signal characteristic in response to a determination that third criteria are met, wherein the third criteria comprises signal strengths for the first signal characteristic and the second signal characteristic being above a third threshold.

In a thirteenth aspect, in combination with any one of the ninth through twelfth aspects, the at least one processor is further configured to transmit one or more repeater parameters regarding the repeater, wherein the location of the UE is based on the one or more repeater parameters.

In a fourteenth aspect, in combination with any one of the ninth through thirteenth aspects, the at least one processor is configured to receive one or more repeater parameters by being configured to receive at least one of a location of the first repeater, an orientation of the first repeater, a range from the first repeater to a base station, or a delay introduced by the first repeater.

In a fifteenth aspect, in combination with any one of the ninth through fourteenth aspects, the at least one processor is configured to obtain the location of the UE by being configured to receive the location from the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving, by the UE, an instruction from a base station (BS) to perform a first signal measurement at a first time and a second signal measurement at a second time;
   determining, by the UE and based on the instruction, a first signal characteristic of a first signal during the first time corresponding to a time when a first repeater, different from the UE, is repeating the first signal from a base station;
   determining, by the UE and based on the instruction, a second signal characteristic of a second signal during the second time corresponding to a time when the first repeater is not repeating the second signal; and
   obtaining, by the UE, a location of the UE, wherein the location of the UE is determined based on the first signal characteristic and the second signal characteristic.

2. The method of claim 1, wherein:
   determining the first signal characteristic comprises determining at least one of a range estimate, angle of departure, or angle of arrival of the first signal; and
   determining the second signal characteristic comprises determining at least one of a range estimate, angle of departure, or angle of arrival of the second signal.

3. The method of claim 1, wherein obtaining the location of the UE comprises:
   transmitting, by the UE, a measurement report comprising the first signal characteristic and the second signal characteristic; and
   receiving, by the UE from the BS, the location determined based on the first signal characteristic and the second signal characteristic.

4. The method of claim 1, wherein obtaining the location of the UE comprises:
   determining, by the UE, the location of the UE based on the first signal characteristic and the second signal characteristic.

5. The method of claim 1, wherein the location of the UE is determined based on the first signal characteristic and the second signal characteristic by:
   determining the location based on the first signal characteristic in response to a determination that first criteria are met;
   determining the location based on the second signal characteristic in response to a determination that second criteria are met; and
   determining the location based on the first signal characteristic and the second signal characteristic in response to a determination that third criteria are met.

6. The method of claim 1, further comprising receiving, by the UE, one or more repeater parameters regarding the first repeater, wherein determining the location of the UE is based on the one or more repeater parameters.

7. The method of claim 6, wherein receiving one or more repeater parameters comprises receiving at least one of a location of the first repeater, an orientation of the first repeater, a range from the first repeater to a base station, or a delay introduced by the first repeater.

8. The method of claim 1, wherein the instruction comprises an instruction to perform a third signal measurement during a third time, and wherein the method further comprises:
   determining, by the UE and based on the instruction, a third signal characteristic of a third signal during the third time corresponding to a time when a second repeater is repeating the third signal.

9. A user equipment (UE), comprising:
   at least one transceiver;
   a memory;
   at least one processor coupled to the at least one transceiver and to the memory, the at least one processor configured to:
      receive, by the UE, an instruction to perform a first signal measurement at a first time and a second signal measurement at a second time;
      determine, by the UE and based on the instruction, a first signal characteristic of a first signal during the first time corresponding to a time when a first repeater, different from the UE, is repeating the first signal from a base station;

determine, by the UE and based on the instruction, a second signal characteristic of a second signal during the second time corresponding to a time when the first repeater is not repeating the second signal; and obtain, by the UE, a location of the UE based on the first signal characteristic and the second signal characteristic.

10. The user equipment (UE) of claim 9,
wherein, to determine the first signal characteristic, the at least one processor is configured to determine at least one of a range estimate, angle of departure, or angle of arrival of the first signal; and
wherein, to determine the second signal characteristic, the at least one processor is configured to determine at least one of a range estimate, angle of departure, or angle of arrival of the second signal.

11. The user equipment (UE) of claim 9, wherein the at least one processor is configured to obtain the location of the UE by being configured to:
transmit, by the UE, a measurement report comprising the first signal characteristic and the second signal characteristic; and
receive, by the UE from the BS, the location determined based on the first signal characteristic and the second signal characteristic.

12. The user equipment (UE) of claim 9, wherein the at least one processor is configured to obtain the location of the UE by being configured to:
determine, by the UE, the location of the UE based on the first signal characteristic and the second signal characteristic.

13. The user equipment (UE) of claim 9, wherein the location of the UE is based on the first signal characteristic and the second signal characteristic by:
determining the location based on the first signal characteristic when first criteria are met;
determining the location based on the second signal characteristic when second criteria are met; and
determining the location based on the first signal characteristic and the second signal characteristic when third criteria are met.

14. The user equipment (UE) of claim 9, wherein the at least one processor is further configured to receive one or more repeater parameters regarding the first repeater, wherein determining the location of the UE is based on the one or more repeater parameters.

15. The user equipment (UE) of claim 14, wherein the at least one processor is configured to receive the one or more repeater parameters by being configured to receive at least one of a location of the first repeater, an orientation of the first repeater, a range from the first repeater to a base station, or a delay introduced by the first repeater.

16. The user equipment (UE) of claim 9, wherein the at least one processor is configured to receive the instruction to perform a third signal measurement during a third time, and wherein the at least one processor is further configured to:
determine, by the UE and in response to receiving the instruction, a third signal characteristic of a third signal during the third time corresponding to a time when a second repeater is repeating the third signal.

17. A method of wireless communication performed by a base station (BS), the method comprising:
transmitting, by the BS, an instruction for a user equipment (UE) to perform a first signal measurement at a first time and a second signal measurement at a second time;

transmitting, by the BS, an instruction for a first repeater, different from the UE, to repeat a first signal corresponding to the first signal measurement during the first time and to not repeat a second signal corresponding to the second signal measurement during the second time; and
transmitting, by the BS, the first signal during the first time and the second signal during the second time.

18. The method of claim 17, wherein:
the instruction to perform the first signal measurement comprises an instruction to determine at least one of a range estimate, angle of departure, or angle of arrival of the first signal; and
the instruction to perform the second signal measurement comprises an instruction to determine at least one of a range estimate, angle of departure, or angle of arrival of the second signal.

19. The method of claim 17, further comprising: transmitting one or more repeater parameters regarding the first repeater, wherein the one or more repeater parameters comprises at least one of a location of the first repeater, an orientation of the first repeater, a range from the first repeater to a base station, or a delay introduced by the first repeater.

20. The method of claim 17, further comprising:
receiving a first signal characteristic corresponding to the first signal measurement and a second signal characteristic corresponding to the second signal measurement; and
obtaining the location of the UE, wherein the location of the UE is based on the first signal characteristic and the second signal characteristic.

21. The method of claim 20, wherein obtaining the location of the UE comprises:
receiving the location from the UE or from a location server.

22. The method of claim 20, wherein obtaining the location of the UE comprises determining, by the BS, the location of the UE based on the first signal characteristic and the second signal characteristic.

23. The method of claim 20, wherein the location of the UE is based on the first signal characteristic and the second signal characteristic by:
determining the location based on the first signal characteristic in response to a determination that first criteria are met;
determining the location based on the second signal characteristic in response to a determination that second criteria are met; and
determining the location based on the first signal characteristic and the second signal characteristic in response to a determination that third criteria are met.

24. A base station (BS), comprising:
at least one transceiver;
a memory; and
at least one processor coupled to the at least one transceiver and to the memory, the at least one processor configured to:
transmit an instruction for a user equipment (UE) to perform a first signal measurement at a first time and a second signal measurement at a second time;
transmit an instruction for a first repeater, different from the UE, to repeat a first signal corresponding to the first signal measurement during the first time and to not repeat a second signal corresponding to the second signal measurement during the second time; and transmit the first signal during the first time and the second signal during the second time.

25. The base station (BS) of claim 24, wherein:
the instruction to perform the first signal measurement comprises an instruction to determine at least one of a range estimate, angle of departure, or angle of arrival of the first signal; and
the instruction to perform the second signal measurement comprises an instruction to determine at least one of a range estimate, angle of departure, or angle of arrival of the second signal.

26. The base station (BS) of claim 24, wherein the at least one processor is further configured to:
receive a first signal characteristic corresponding to the first signal measurement and a second signal characteristic corresponding to the second signal measurement; and
obtain the location of the UE, wherein the location of the UE is based on the first signal characteristic and the second signal characteristic.

27. The base station (BS) of claim 26, wherein the at least one processor is configured to obtain the location of the UE by being configured to:
determine, by the BS, the location of the UE based on the first signal characteristic and the second signal characteristic.

28. The base station (BS) of claim 26, wherein the location of the UE is based on the first signal characteristic and the second signal characteristic by:
determining the location of the UE based on the first signal characteristic in response to a determination that first criteria are met, wherein the first criteria comprises a signal strength for the first signal characteristic being below a first threshold;
determining the location of the UE based on the second signal characteristic in response to a determination that second criteria are met, wherein the second criteria comprises a signal strength for the second signal characteristic being below a second threshold; and
determining the location of the UE based on the first signal characteristic and the second signal characteristic in response to a determination that third criteria are met, wherein the third criteria comprises signal strengths for the first signal characteristic and the second signal characteristic being above a third threshold.

29. The base station (BS) of claim 26, wherein the at least one processor is configured to obtain the location of the UE by being configured to receive the location from the UE or being configured to receive the location from a location server.

30. The base station (BS) of claim 24, wherein the at least one processor is further configured to:
transmit one or more repeater parameters regarding the first repeater by being configured to transmit at least one of a location of the first repeater, an orientation of the first repeater, a range from the first repeater to the base station, or a delay introduced by the first repeater.

* * * * *